(12) United States Patent
Zapata

(10) Patent No.: US 10,730,623 B2
(45) Date of Patent: Aug. 4, 2020

(54) PRESSURIZED-FLUID FLIGHT SYSTEMS AND METHODS OF USE THEREOF

(71) Applicant: ZipH2O, Le Rove (FR)

(72) Inventor: Franky Zapata, Le Rove (FR)

(73) Assignee: ZIPH2O, Le Rove (FR)

( * ) Notice: Subject to any disclaimer, the term of this patent is extended or adjusted under 35 U.S.C. 154(b) by 445 days.

(21) Appl. No.: 15/805,490

(22) Filed: Nov. 7, 2017

(65) Prior Publication Data

US 2018/0127095 A1 May 10, 2018

Related U.S. Application Data

(60) Provisional application No. 62/418,750, filed on Nov. 7, 2016.

(30) Foreign Application Priority Data

Jun. 6, 2017 (FR) ...................................... 17 55013

(51) Int. Cl.
| | |
|---|---|
| *B64C 39/02* | (2006.01) |
| *B63H 11/00* | (2006.01) |
| *B63H 11/04* | (2006.01) |
| *B63H 11/08* | (2006.01) |
| *B63H 11/113* | (2006.01) |
| *A63B 35/12* | (2006.01) |
| *B63B 34/10* | (2020.01) |
| *B64C 25/54* | (2006.01) |

(52) U.S. Cl.
CPC ............ *B64C 39/026* (2013.01); *A63B 35/12* (2013.01); *B63B 34/10* (2020.02); *B63H 11/00* (2013.01); *B63H 11/04* (2013.01); *B63H 11/08* (2013.01); *B63H 11/113* (2013.01); *B64C 25/54* (2013.01); *B63H 2011/006* (2013.01); *B63H 2011/081* (2013.01)

(58) Field of Classification Search
CPC ....... B63B 35/00; B63B 35/73; B63B 35/731; B63H 11/00; B63H 11/04; B63H 11/08
USPC ................................ 114/55.5, 55.57; 440/39
See application file for complete search history.

(56) References Cited

U.S. PATENT DOCUMENTS

| | | | | |
|---|---|---|---|---|
| 7,258,301 B2 * | 8/2007 | Li | ........................... | B63H 11/04 440/38 |
| 7,614,355 B2 * | 11/2009 | Zeyger | ................... | B63H 11/00 114/55.58 |

(Continued)

*Primary Examiner* — Lars A Olson

(74) *Attorney, Agent, or Firm* — Buchanan Ingersoll & Rooney PC

(57) ABSTRACT

A propulsion device, including a platform arranged to seat a passenger; a thrust assembly coupled to the platform, the thrust assembly including at least two nozzles configured to discharge a pressurized fluid therefrom that are movable with respect to the platform; a plurality of actuators, wherein each actuator is coupled to one of the at least two nozzles, wherein each actuator is configured to adjust an angular orientation of its respective nozzle with respect to the platform; a first sensor coupled to the platform to measure at least one of a pitch and roll of the platform; and a controller in communication with the first sensor and the plurality of actuators, wherein the controller is configured to adjust an operation of the actuators based at least in part on information from the first sensor to modify an angular orientation of the at least two nozzles.

20 Claims, 7 Drawing Sheets

(56) References Cited

U.S. PATENT DOCUMENTS

| | | | | |
|---|---|---|---|---|
| 7,900,867 B2* | 3/2011 | Li | ............ | B63H 11/04 |
| | | | | 440/38 |
| 8,960,115 B2* | 2/2015 | Frisky | ............ | B63H 11/04 |
| | | | | 114/55.58 |

* cited by examiner

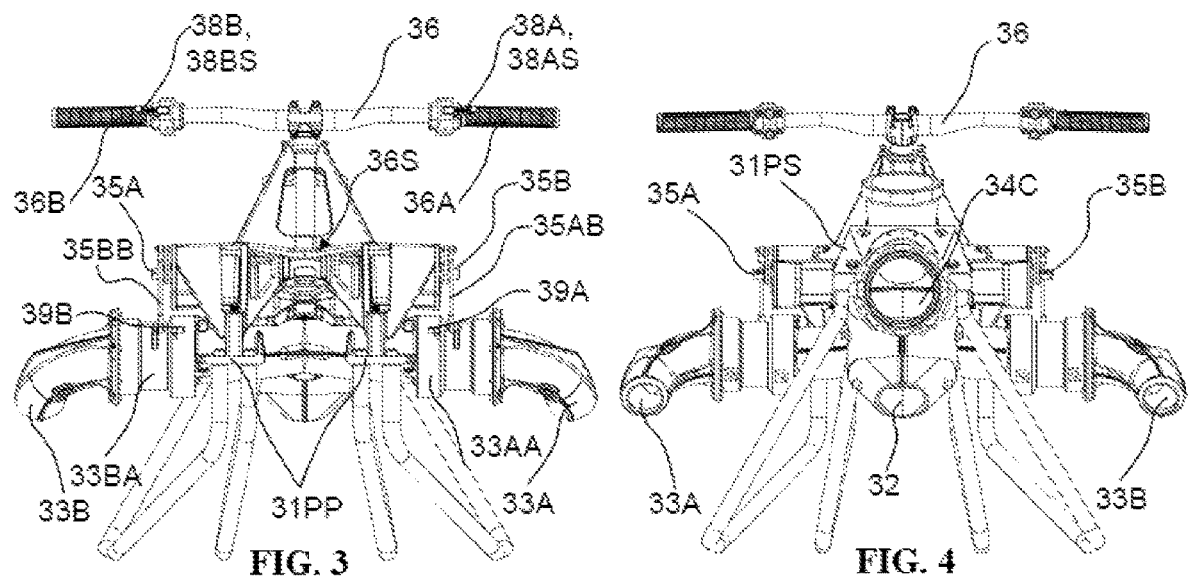
FIG. 3
FIG. 4
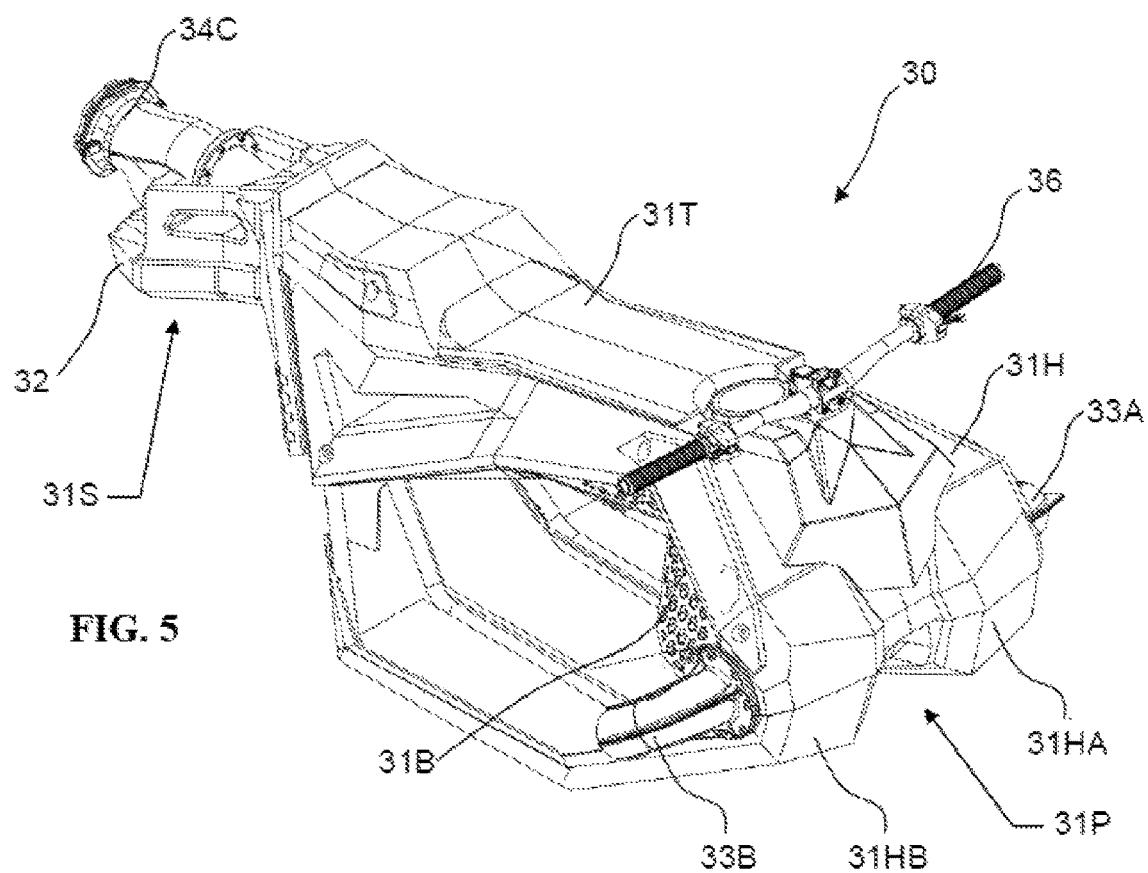
FIG. 5

PRESSURIZED-FLUID FLIGHT SYSTEMS AND METHODS OF USE THEREOF

CROSS-REFERENCE TO RELATED APPLICATION

This application is related to and claims priority to U.S. Provisional Patent Application Ser. No. 62/418,750, filed Nov. 7, 2016, entitled "PRESSURIZED-FLUID FLIGHT SYSTEMS AND METHODS OF USE THEREOF," the entirety of which is incorporated herein by reference. This application also claims priority to France Patent Application No. 1755013, filed on Jun. 6, 2017, the entirety of which is incorporated herein by reference.

STATEMENT REGARDING FEDERALLY SPONSORED RESEARCH OR DEVELOPMENT n/a

FIELD OF THE INVENTION

The present disclosure relates to pressurized-fluid flight systems and methods of use thereof.

BACKGROUND OF THE INVENTION

A number of water-propelled, personal flight devices have recently become available, such as those devices disclosed in U.S. Pat. Nos. 8,336,805 and 7,258,301, among others. Operation of such devices may require balancing the weight and resulting forces of a passenger's body about a platform or seat, and/or balancing and operating controls of the output nozzles to provide stable flights. Such balancing may require high levels of dexterity and fine-motor control. In addition, should the passenger tilt or misdirect the nozzles and start to lose balance, it may be difficult for some passengers to counteract the tilting moment as the tilt angle increases, resulting in unwanted falling. These combined requirements and circumstances can be physically taxing during use and intimidating to a beginner learning to use the devices. The present disclosure provides examples of personal propulsion systems, devices, ands methods of use thereof having improved operability and use.

SUMMARY OF THE INVENTION

The examples disclosed herein make it possible to meet the vast majority disadvantages raised by other hydroflight devices. The many benefits provided by a device according to the present disclosure include:—ease of use and offer a wide variety of applications and trajectories;—the ability to take flight without strenuous exertion of physical abilities;—selectable control of a nominal altitude, with the user having only to orient oneself horizontally;—devices providing a variety of movements that can provide personal flight experiences with a small learning curve, safely and without fatigue.

The present disclosure provides a propulsion device, including a platform arranged to support a passenger; a thrust group comprising a main nozzle expelling fluid from a fluid outlet in a given direction, said main nozzle being oriented substantially from the bow to the stern of the propulsion device so that said direction of expulsion of fluid falls within a first median plane of the propulsion device, said first median plane separating a port half of a starboard half of the propulsion device; and means to collect and distribute a pressurized fluid to said thrust group, said means being supplied with fluid pressurized by a feed duct, and cooperating with the platform through an embedded link.

To control the attitude and altitude of a longitudinal axis plane of said propulsion device and to provide automatic piloting assistance to its user, the thrust group may include two cooperating secondary nozzles in fluid communication with said means for collecting and distributing a pressurized fluid, that receives a pressurized fluid, said secondary nozzles being movably mounted along a transverse axis of said propulsion device, said axis being perpendicular to said first median plane, to deliver said pressurized fluid according to respective fluid directions in second median planes that are distinct and parallel to the first middle plane of the propulsion device within which the direction of fluid of the main nozzle disperses fluid.

In addition, said main nozzle of the thrust group may be positioned substantially at the stern of the propulsion device and the secondary nozzles may be positioned substantially at the bow of said propulsion device.

The propulsion device may include a means to collect and dispense a pressurized fluid that is in fluid communication with said supply conduit through a pivoting connection at the proximal portion of said means.

According to one example, the platform may comprise a rigid frame, buoyancy elements, one or more fairings or outer body components, and a seat on which one or more passengers can sit.

To facilitate the boarding of a passenger on a propulsion device according to the present disclosure and to promote ease of takeoff, the buoyancy elements may advantageously be arranged to partially maintain the bow above the water when the propulsion device is positioned on the surface of a body of water/fluid and when said passenger occupies a sitting position on said seat.

An example of a propulsion device according to the present disclosure may include an actuator associated with each secondary nozzle to drive or cause rotation of the nozzle automatically and/or selectively during operation of the propulsion device. Such rotation may be along a transverse axis of the propulsion device with respect to the direction of fluid expulsion from the secondary nozzle in one of said second median planes.

The propulsion device may include electrical controls that control and/or send signals to the actuators associated with the secondary nozzles. According to one example, said propulsion device may further include a processing unit to manipulate and/or drive the electrical controls to adjust and/or maintain an operation or position of the actuators.

To allow a user to change the trajectory of a propulsion device, the propulsion device may include a man-machine or user interface designed to translate a gesture or input of said user. For example, an input to change the direction or angular position of the propulsion device in the longitudinal plane of the propulsion device and/or around a longitudinal axis of said propulsion device. In addition, and/or alternatively, an instruction or input may result in an altitude change.

In another example, the processing unit may translate a cruising attitude and altitude reference point of a longitudinal plane of the propulsion device. In this case, such a propulsion device may include first and second sensors for measuring the respective angular positions of the secondary nozzles to an angular position reference; a third sensor delivering a measurement of the roll and/or pitch experienced by the propulsion device in said longitudinal plane respectively around a longitudinal axis and a transverse axis about said propulsion device.

To increase the performance of a propulsion device according to the present disclosure, and in particular by preventing any unnecessary loss of thrust in the distribution of the pressurized fluid, at least part of the means for collecting and distributing said pressurized fluid as well as the main thrust group nozzle may include an oblong section.

In another aspect, the present disclosure provides a propulsion system comprising a propulsion device as explained herein and cooperating with a remote pressurization station, said station supplying pressurized fluid to said propulsion device via the supply duct. To reduce acquisition and maintenance of such a system, the remote pressurization station may advantageously consist of a nautical vehicle or personal watercraft with a hull, means of propulsion including the capacity to pressurize an ingested fluid with an impeller or other fluid-ingesting mechanism to draw fluid into an inlet and expelling said fluid under pressure from a fluid outlet at the back said vehicle/watercraft.

In another aspect, the present disclosure provides a method of piloting the secondary nozzles of a propulsion device. Such method provides automatic piloting assistance to any novice or experienced user. Such process may be implemented by the processing unit of a propulsion device, and may include a step of generating a signal or command to change the relative positions of said secondary nozzles to provide a change of direction, attitude, altitude, pitch, and/or roll of the propulsion device via the actuators. The method may include measuring the roll of said propulsion device; generating a signal or command to modify an average position of said secondary nozzles from a setpoint to change an altitude of said propulsion device; measuring a pitch of said propulsion device; and generating a signal or command to cause a difference in relative positions of secondary nozzles. In one example, such a process may include implementation of a PID controller to cooperatively manipulate the position and thrust vectors of the nozzles through high frequency feedback of the actual position and angular orientation of the propulsion device.

The present disclosure further advantageously provides a personal propulsion device, comprising a platform configured to support at least one passenger; a first fluid outlet coupled to the platform; a first fluid conduit in fluid communication with the first fluid outlet; and a personal watercraft having first and second fluid discharge ports, wherein the first fluid discharge port is in fluid communication with the first fluid conduit, and the second fluid discharge port is configured to discharge pressurized fluid to move the personal watercraft. The first fluid outlet may be configured to expel the pressurized fluid to elevate the platform. The delivery of pressurized fluid to the first fluid outlet may be selectively adjustable. The device may include a fluid control valve coupled to the first fluid outlet and/or a fluid control valve coupled to the first fluid discharge port. The first fluid conduit may be an elongated, flexible hose. The device may include a second fluid outlet coupled to the platform, and a second fluid conduit in fluid communication with the second fluid outlet, where the first fluid discharge port is in fluid communication with the second fluid conduit. The second fluid conduit may be an elongated, flexible hose. The first fluid conduit may be movable about the platform, and the device may include a position assessment element configured to measure at least one of an angle and a distance between the platform and the first fluid conduit. The position assessment element may include at least one of an angular position sensor, a rotary encoder, an optical sensor, and an impedance sensor. The device may be configured to adjust delivery of pressurized fluid to the first fluid outlet based upon information provided and/or obtained by the position assessment element. The device may include an altitude sensor coupled to the platform, and the device may be configured to adjust delivery of pressurized fluid to the first fluid outlet based upon information provided by the altitude sensor. The platform may be configured to support the at least one passenger in a seated position, and/or the personal watercraft may be configured to transport one or more passengers thereon.

A personal propulsion device is provided, including a platform configured to support at least one passenger in a seated position; a first fluid outlet coupled to the platform; a second fluid outlet coupled to the platform; and an elongated, flexible fluid conduit in fluid communication with the first and second fluid outlets to deliver pressurized fluid thereto, wherein delivery of pressurized fluid to the first fluid outlet is adjustable independently of delivery of pressurized fluid to the second fluid outlet, and wherein the first and second fluid outlets are configured to expel the pressurized fluid to directly elevate the platform to achieve flight. The device may include fluid control valves coupled to each of the first and second fluid outlets. The device may include a personal watercraft having first and second fluid discharge ports, where the first fluid discharge port is in fluid communication with the fluid conduit, and the second fluid discharge port is configured to discharge pressurized fluid to move the personal watercraft.

A personal propulsion system is provided, including a platform configured to support at least one passenger in a seated position; a first fluid outlet coupled to an underside of the platform; a second fluid outlet coupled to the underside of the platform; a first flexible fluid conduit in fluid communication with the first fluid outlet; a second flexible fluid conduit in fluid communication with the second fluid outlet; and a personal watercraft having first and second fluid discharge ports, where the first fluid discharge port is in fluid communication with the first and second fluid conduits to deliver pressurized fluid to the first and second fluid outlets, where delivery of pressurized fluid to the first fluid outlet is adjustable independently of delivery of pressurized fluid to the second fluid outlet, where the first and second fluid outlets are configured to expel pressurized fluid to directly elevate the platform to achieve flight, and where the second fluid discharge port is configured to discharge pressurized fluid to move the personal watercraft. At least one of the first and second fluid conduits may be movable about the platform, and the system may include a position assessment element configured to measure at least one of an angle and a distance between the platform and the at least one of the first and second fluid conduit A method of operating a personal propulsion device is provided, including coupling a personal watercraft to a personal propulsion device having a platform configured to support a passenger, wherein the platform is coupled to one or more fluid outlets, and wherein the personal watercraft has first and second fluid discharge ports; delivering a pressurized fluid from the first fluid discharge port to the one or more fluid outlets such that the fluid outlets discharge the pressurized fluid to directly elevate the platform; and discharging pressurized fluid from the second fluid discharge port to move the personal watercraft. The method may include moving the personal watercraft independently of the personal propulsion device. The method may include adjusting the delivery of the pressurized fluid from the first fluid discharge port to the one or more fluid outlets to control an elevation of the personal propulsion device. Adjusting the delivery of pressurized fluid may include adjusting an operation of the personal watercraft from the personal propulsion device. The method may include adjusting the discharge of the pressurized fluid from the second fluid discharge port to adjust a speed of the personal watercraft. The pressurized fluid may be delivered from the first fluid discharge port to the one or more fluid outlets through at least one flexible hose. The method may include pulling the personal propulsion device by the flexible hose with the personal watercraft. The platform may be configured to support the at least one passenger in a seated position and/or the personal watercraft is configured to transport one or more passengers thereon.

A method of operating a personal propulsion device is disclosed, including coupling a personal watercraft to a personal propulsion device, the personal propulsion device including a platform configured to support a passenger, and first and second fluid outlets coupled to the platform; delivering a pressurized fluid from a first fluid discharge port of the personal watercraft to the first and second fluid outlets such that the first and second fluid outlets expel the pressurized fluid to directly elevate the platform for flight; and adjusting delivery of the pressurized fluid to the first fluid outlet independently of the delivery of pressurized fluid to the second fluid outlet to affect a position of the platform. Adjusting delivery of the pressurized fluid to the first fluid outlet may include operating a valve coupled to the first fluid outlet. Adjusting delivery of the pressurized fluid to the first fluid outlet may include operating a valve coupled to the first fluid discharge port. Adjusting delivery of the pressurized fluid to the first fluid outlet may include modifying the delivery of pressurized fluid through a first flexible fluid conduit coupled to the first fluid outlet, while substantially maintaining the delivery of pressurized fluid through a second flexible fluid conduit coupled to the second fluid outlet. The method may include discharging pressurized fluid from a second fluid discharge port of the personal watercraft to move the personal watercraft within a body of water. The method may include pulling the personal propulsion device with the personal watercraft and/or moving the personal watercraft independently of the personal propulsion device.

A method of operating a personal propulsion device is disclosed, including coupling a personal watercraft to a personal propulsion device through first and second flexible fluid conduits, wherein the personal propulsion device includes a platform configured to support a passenger, and first and second fluid outlets coupled to the platform; delivering a pressurized fluid from the personal watercraft through the first flexible fluid conduit to the first fluid outlet; delivering a pressurized fluid from the personal watercraft through the second flexible fluid conduit to the second fluid outlet, wherein the first and second fluid outlets expel the pressurized fluid to directly elevate the platform for flight; adjusting delivery of the pressurized fluid to the first fluid outlet independently of the delivery of pressurized fluid to the second fluid outlet to affect a position of the platform, and discharging pressurized fluid from a first fluid discharge port of the personal watercraft to move the personal watercraft within a body of water such that the personal watercraft pulls the personal propulsion device by the first and second flexible fluid conduits. Adjusting delivery of the pressurized fluid to the first fluid outlet may be performed by one or more controls coupled to the platform and/or operating a valve proximate to a second fluid discharge port of the personal watercraft. Adjusting delivery of the pressurized fluid to the first fluid outlet may include operating a valve proximate to the first fluid outlet.

A method of operating a personal propulsion device is provided, including coupling a fluid delivery conduit to a personal propulsion device, wherein the fluid delivery conduit is movable with respect to the personal propulsion device, and wherein the personal propulsion device includes a platform configured to support a passenger, and one or more fluid outlets; delivering a pressurized fluid from the fluid delivery conduit to the one or more fluid outlets of the personal propulsion device such that the one or more fluid outlets discharge the pressurized fluid to directly elevate the platform; measuring at least one of an angle and a distance between a portion of the platform and a portion of the fluid delivery conduit; and adjusting the delivery of pressurized fluid based at least in part on the measurement. The fluid delivery conduit may be an elongated, flexible hose. Measuring at least one of an angle and distance may be performed at least in part by at least one of an angular position sensor, a rotary encoder, an optical sensor, and an impedance sensor. Delivering pressurized fluid may include delivering pressurized fluid from a personal watercraft to the fluid delivery conduit. Adjusting the delivery of pressurized fluid may include adjusting an operation of the personal watercraft from the personal propulsion device. Adjusting delivery of the pressurized fluid may include operating a valve located proximate to a fluid discharge port of the personal watercraft. The method may include discharging pressurized fluid from a fluid discharge port of the personal watercraft to move the personal watercraft within a body of water. The method may include moving the personal watercraft independently of the personal propulsion device and/or pulling the personal propulsion device by the fluid delivery conduit with the personal watercraft. Adjusting delivery of the pressurized fluid to the first fluid outlet may include operating a valve coupled to the one or more fluid outlets. The platform may be configured to support the at least one passenger in a seated position and/or the personal watercraft may be configured to transport one or more passengers thereon.

A method of operating a personal propulsion device is provided, including coupling first and second fluid conduits to a personal propulsion device, the personal propulsion device including a platform configured to support a passenger, and first and second fluid outlets coupled to the platform; delivering a pressurized fluid from the first and second fluid conduits to the first and second fluid outlets such that the first and second fluid outlets expel the pressurized fluid to directly elevate the platform for flight; and measuring at least one of an angle and a distance between a portion of the platform and a portion of the first fluid conduit; and adjusting the delivery of pressurized fluid to the first fluid outlet based at least in part on the measurement. Adjusting delivery of the pressurized fluid to the first fluid outlet may be performed independently of the delivery of pressurized fluid to the second fluid outlet. Adjusting delivery of the pressurized fluid to the first fluid outlet may be performed to affect at least one of a position and height of the platform. Delivering pressurized fluid may include delivering pressurized fluid from a personal watercraft to the fluid delivery conduit, and the method may include discharging pressurized fluid from a fluid discharge port of the personal watercraft to move the personal watercraft within a body of water.

A method of operating a personal propulsion device is provided, including coupling a personal watercraft to a personal propulsion device through first and second flexible fluid conduits, wherein the personal propulsion device includes a platform configured to support a passenger, and first and second fluid outlets coupled to the platform; delivering a pressurized fluid from the personal watercraft through the first flexible fluid conduit to the first fluid outlet; delivering a pressurized fluid from the personal watercraft through the second flexible fluid conduit to the second fluid outlet, wherein the first and second fluid outlets expel the pressurized fluid to directly elevate the platform for flight; measuring at least one of an angle and a distance between a portion of the platform and a portion of at least one of the first and second fluid conduits; and adjusting the delivery of pressurized fluid to at least one of the first and second fluid outlets based at least in part on the measurement to affect a position of the platform; and discharging pressurized fluid from a first fluid discharge port of the personal watercraft to move the personal watercraft within a body of water such that the personal watercraft pulls the personal propulsion device by the first and second flexible fluid conduits. Adjusting delivery of the pressurized fluid to the first fluid outlet may be performed by one or more controls coupled to the platform, may include operating a valve proximate to a second fluid discharge port of the personal watercraft, and/or may include operating a valve proximate to at least one of the first and second fluid outlets.

A personal propulsion device is disclosed, including a platform configured to support at least one passenger; a first fluid outlet coupled to the platform, wherein the first fluid outlet is movably positionable along a length of the platform, and wherein the first fluid outlet is configured to expel pressurized fluid to elevate the platform; and a first fluid conduit in fluid communication with the first fluid outlet. The first fluid outlet may be slidably engaged to a track attached to the platform. The device may include at least one of a pneumatic actuator, hydraulic actuator, and electric actuator coupled to the first fluid outlet and operable to move the first fluid outlet. The device may include at least one of an accelerometer, altimeter, and tilt sensor coupled to the platform, and/or an actuator configured to move the first fluid outlet based at least in part on a signal generated by the at least one of an accelerometer, altimeter, and tilt sensor. The device may include a pressurized fluid source coupled to the first fluid conduit, and the pressurized fluid source may include a personal watercraft. The personal watercraft may include first and second fluid discharge ports, where the first fluid discharge port is in fluid communication with the first fluid conduit, and the second fluid discharge port is configured to discharge pressurized fluid to move the personal watercraft. The device may include a fluid control valve coupled to the first fluid discharge port. The platform may be configured to support the at least one passenger in a seated position, and the personal watercraft may be configured to transport one or more passengers thereon. An amount of pressurized fluid expelled from the first fluid outlet may be selectively adjustable. The device may include a fluid control valve coupled to the first fluid outlet. The first fluid conduit may include an elongated, flexible hose. The device may include a second fluid outlet coupled to the platform, where the second fluid outlet is movably positionable along a length of the platform, and where the second fluid outlet is configured to expel pressurized fluid to elevate the platform. The device may include a second fluid conduit in fluid communication with the second fluid outlet.

A personal propulsion device is provided, including a platform configured to support at least one passenger in a seated position; a first fluid outlet coupled to the platform; a second fluid outlet coupled to the platform, wherein first and second fluid outlets are movably positionable along a length of the platform; at least one of an accelerometer, altimeter, and tilt sensor coupled to the platform; an actuator configured to move the first fluid outlet based at least in part on a signal generated by the at least one of an accelerometer, altimeter, and tilt sensor; an elongated, flexible fluid conduit in fluid communication with the first and second fluid outlets to deliver pressurized fluid thereto, wherein the first and second fluid outlets are configured to expel the pressurized fluid to directly elevate the platform to achieve flight, and a pressurized fluid source coupled to the flexible fluid conduit. The device may include fluid control valves coupled to each of the first and second fluid outlets. The pressurized fluid source may include a personal watercraft. The personal watercraft may include first and second fluid discharge ports, where the first fluid discharge port is in fluid communication with the first fluid conduit, and the second fluid discharge port is configured to discharge pressurized fluid to move the personal watercraft. The platform may be configured to support the at least one passenger in a seated position, and/or the personal watercraft may be configured to transport one or more passengers thereon.

A method of operating a personal propulsion device is provided, including coupling a fluid delivery conduit to a personal propulsion device having a platform configured to support a passenger, and one or more fluid outlets; delivering a pressurized fluid from the fluid delivery conduit to the one or more fluid outlets of the personal propulsion device such that the one or more fluid outlets discharge the pressurized fluid to directly elevate the platform; measuring at least one of a pitch, yaw, or roll movement of the platform; and moving a position of the one or more fluid outlets along a length of the platform based at least in part on the measurement. The method may include adjusting the delivery of pressurized fluid based at least in part on the measurement. Delivering pressurized fluid may include delivering pressurized fluid from a personal watercraft to the fluid delivery conduit. The method may include discharging pressurized fluid from a fluid discharge port of the personal watercraft to move the personal watercraft within a body of water. The method may include moving the personal watercraft independently of the personal propulsion device and/or pulling the personal propulsion device by the fluid delivery conduit with the personal watercraft. The personal watercraft may be configured to transport one or more passengers thereon. The fluid delivery conduit may include an elongated, flexible hose. The platform may be configured to support a passenger in a seated position.

A method of operating a personal propulsion device is provided, including coupling a fluid delivery conduit to a personal propulsion device having a platform configured to support a passenger, and one or more fluid outlets; delivering a pressurized fluid from the fluid delivery conduit to the one or more fluid outlets of the personal propulsion device such that the one or more fluid outlets discharge the pressurized fluid to directly elevate the platform; measuring at least one of an angle and a distance between a portion of the platform and a portion of the fluid delivery conduit; and moving a position of the one or more fluid outlets along a length of the platform based at least in part on the measurement. Measuring at least one of an angle and distance may be performed at least in part by at least one of an angular position sensor, a rotary encoder, an optical sensor, and an impedance sensor. The method may include adjusting the delivery of pressurized fluid based at least in part on the measurement. Adjusting delivery of the pressurized fluid may include operating a valve located proximate to the one or more fluid outlets. Delivering pressurized fluid may include delivering pressurized fluid from a personal watercraft to the fluid delivery conduit, the method further including discharging pressurized fluid from a fluid discharge port of the personal watercraft to move the personal watercraft within a body of water and/or pulling the personal propulsion device by the fluid delivery conduit with the personal watercraft.

A method of operating a personal propulsion device is disclosed, including coupling first and second fluid conduits to a personal propulsion device, the personal propulsion device including a platform configured to support a passenger, and first and second fluid outlets coupled to the platform; delivering a pressurized fluid from the first and second fluid conduits to the first and second fluid outlets such that the first and second fluid outlets expel the pressurized fluid to directly elevate the platform for flight; measuring at least one of an angle and a distance between a portion of the platform and a portion of the first fluid conduit; and moving a position of the first and second fluid outlets along the platform based at least in part on the measurement. The method may include adjusting the delivery of pressurized fluid based at least in part on the measurement. Adjusting delivery of the pressurized fluid may include adjusting delivery of pressurized fluid to the first fluid outlet independently of the delivery of pressurized fluid to the second fluid outlet. Delivering pressurized fluid may include delivering pressurized fluid from a personal watercraft to the first and second fluid conduits. The method may include discharging pressurized fluid from a fluid discharge port of the personal watercraft to move the personal watercraft within a body of water.

A propulsion device is also provided, including a platform arranged to seat a passenger; a thrust assembly coupled to the platform, the thrust assembly including at least two nozzles configured to discharge a pressurized fluid therefrom, wherein the at least two nozzles are movable with respect to the platform; a plurality of actuators, wherein each actuator is coupled to one of the at least two nozzles, wherein each actuator is configured to adjust an angular orientation of its respective nozzle with respect to the platform; a first sensor coupled to the platform to measure at least one of a pitch and roll of the platform; and a controller in communication with the first sensor and the plurality of actuators, wherein the controller is configured to adjust an operation of the actuators based at least in part on information from the first sensor to modify an angular orientation of the at least two nozzles. The device may include a remote pressurization station supplying pressurized fluid to the thrust assembly, where the remote pressurization station may be coupled to the assembly by a flexible supply conduit and/or the remote pressurization station may be a personal watercraft. The at least two nozzles may be respectively positioned at port and starboard positions of the platform. The device may include a sensor configured to measure a pressure of a pressurized fluid flowing through the thrust assembly, where the second sensor is in communication with the controller, and the controller may be configured to adjust an operation of the actuators based at least in part on information from the second sensor. The device may include a plurality of sensors, where each of the plurality of sensors is configured to measure an angular position of one of the at least two nozzles, and where the plurality of sensors is in communication with the controller, and the controller may be configured to adjust an operation of the actuators based at least in part on information from the plurality of sensors. The device may include a user interface coupled to the platform that is configured to receive input from a user comprising at least one of a change of direction input and a change of altitude input, and where the controller is in communication with the user interface. The controller may be configured to adjust an operation of the actuators based at least in part on information from the user interface. The device may include a sensor coupled to the platform configured to measure an altitude of the platform, wherein the sensor is in communication with the controller, and wherein the controller is configured to adjust an operation of the actuators based at least in part on information from the sensor. The controller may implement a PID calculation to adjust an operation of the actuators. The at least two nozzles may be movable in a plane that is substantially parallel to a longitudinal axis of the platform extending from a stern to a bow of the platform.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIGS. 3 and 4 respectively describe front and back views of the frame of a non-limiting example of a propulsion device according to the present disclosure;

FIGS. 5 and 6 show perspective views of a non-limiting example of a propulsion device according to the present disclosure;

DETAILED DESCRIPTION OF THE INVENTION

The present disclosure provides examples of personal propulsion systems, devices, and methods of use thereof having improved operability and use.

According to an example of a propulsion device according to the invention, described in connection with FIGS. 1 to 7, such a device 30 has a main body in the form of a platform 31 which only a frame is illustrated on FIGS. 1 to 4. Said armature cooperates with a fairing 31H, as illustrated by way of example in FIGS. 5 to 7. Depending on the size of the platform 31 and the power of the remote pressurization station supplying pressurized fluid to said propulsion device 30, (said station omitted for simplicity in FIGS. 2-7, but represented in FIG. 8), the disclosed devices and systems provide that several passengers U1, U2 can possibly simultaneously ride and/or fly on said device 30. Such a device configuration is illustrated as a non-limiting example in FIG. 7.

Figure 8:
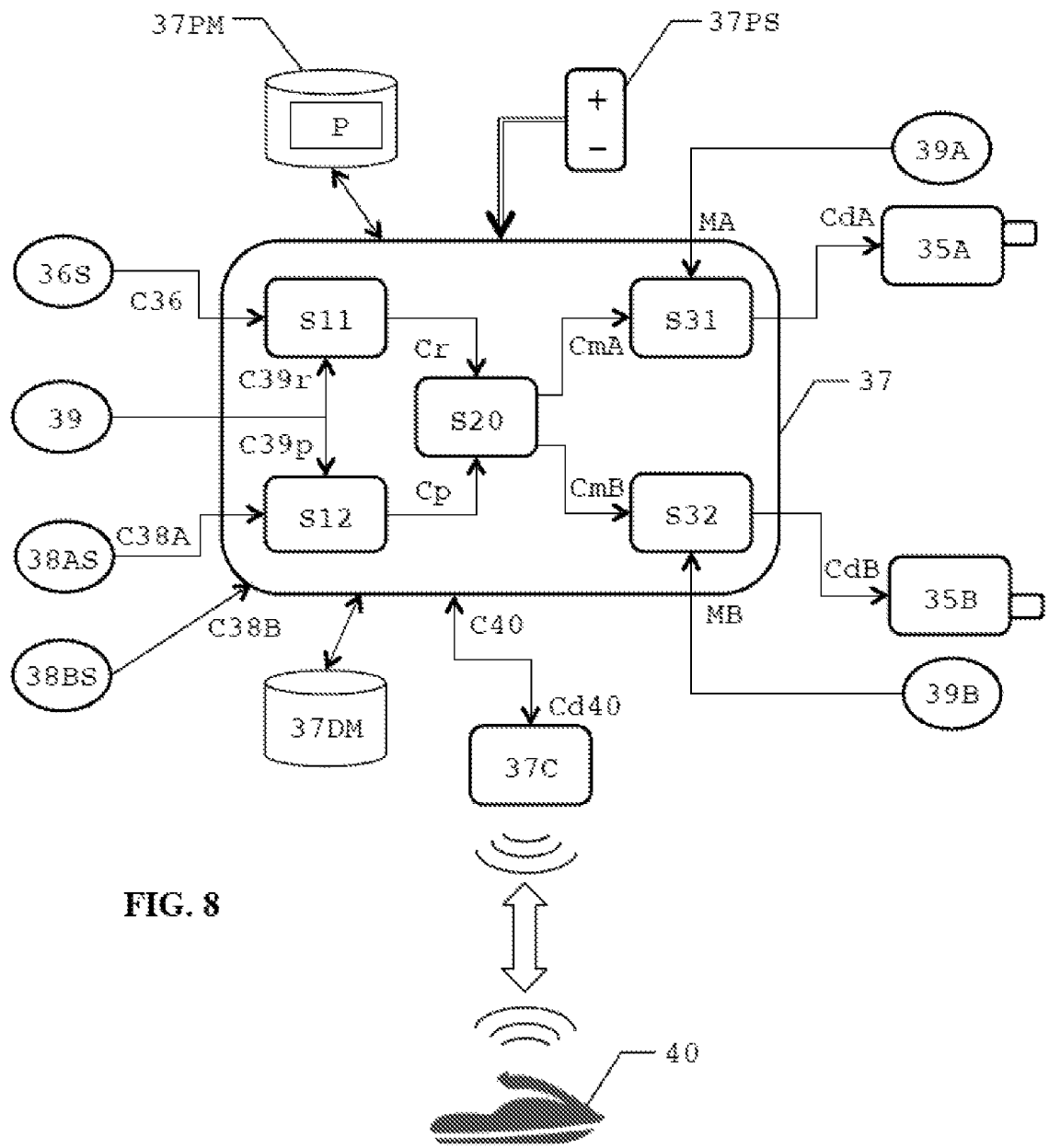
FIG. 8 illustrates a flowchart of a non-limiting example of implementing a method of piloting secondary nozzles of a propulsion device according to the present disclosure.

Such a remote pressurization station, referenced 40 in FIG. 8, can be a dedicated device or an apparatus whose original main function differs from supplying a fluid under pressure to a propulsion device. For example, the disclosure provides that a land-based or nautical-based fire-rescue vehicle can be operated as a remote pressurization station if it has a capacity of sufficient fluid pressurization. The devices disclosed herein may alternatively take advantage of the natural fluid pressurization function of a personal watercraft, such as, for example, the RUNABOUT MZR 2011 edition provided by the manufacturer ZAPATA RACING. Such a vehicle 40 has a hull and houses propulsion means that implements fluid pressurization by spinning an impeller, with said fluid being ingested from an entrance under the hull. Said fluid is thus pressurized and expelled from a fluid outlet located at the rear or stern of the vehicle.

Such a fluid outlet presents itself typically in the form of a directional cone operated to modify the trajectory of the watercraft. The propulsion means/impeller is driven generally by means of a combustion engine. In order to implement the use of the watercraft as remote pressurization station 40, a flange can be applied on the fluid outlet and then connected to an end of a supply duct 2 to route the pressurized fluid expelled from the fluid outlet of the watercraft. The supply duct 2 is connected to the other end 34C, using a tip 2a means to deliver the pressurized fluid to a propulsion device 30 according to the disclosure as set forth herein.

Figure 1:
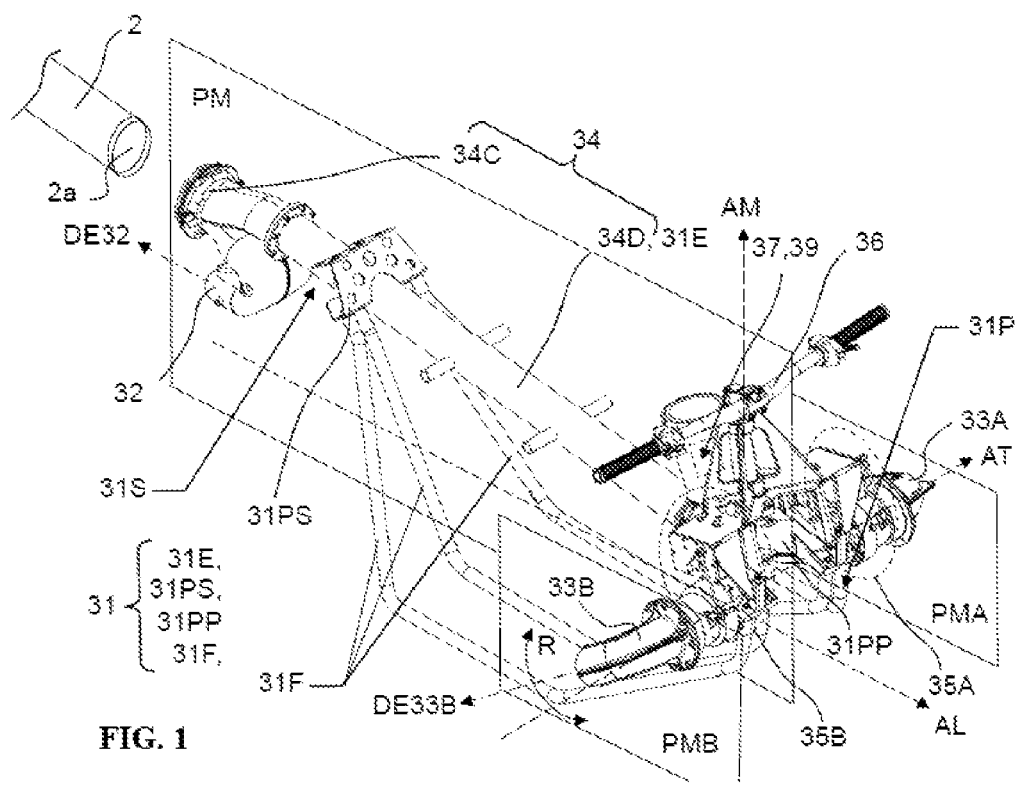
FIG. 1 illustrates a perspective view of the framework of a non-limiting example of a propulsion device according to the present disclosure.

According to FIG. 1, the platform 31 of such propulsion device 30 consists of a tubular structure having a plurality of tubes 31F and/or beams 31E, which may be advantageously hollow to reduce the weight. The role of said structure 31 is to provide a skeleton or frame of the main body of the device 30. The material or materials usable to constitute such a structure 31 can be selected from aluminum, a stainless alloy, or carbon fibers or other suitable polymers, that is to say, more generally, any material with of the functional characteristics providing decreased weight, robustness/rigidity, and chemical neutrality (e.g., causing no chemical reaction when in contact with a liquid medium). As indicated in FIGS. 1 and 2, such a tubular framework 31F may comprise or cooperate with a beam or more generally a rigid main element 31E, which may be integral and/or cooperative with all or part of the means 34D to dispense a compressed fluid from an inlet fluid 34C, located at the stern 31S of the propulsion device 30, to multiple secondary and lateral nozzles 33A and 33B, located in turn at the bow 31P of said propulsion device 30.

The tubular structure 31F can thus be coupled to/and or comprise portions of said main beam 31E at the stern 31S of the propulsion device 30, with a bracket 31PS thus bearing on said beam 31E, or embedded in it, as shown in FIG. 1. At the bow 31P, the tubular structure 31F cooperates with a second bracket 31PP, optionally comprising one or several integral parts to couple the components, as shown in FIGS. 1 and 3. Such mechanical links, respectively at the stern 31S and at the bow 31P, may consist of bindings by screwing or bolting, or even by welding.

The propulsion device 30 may be defined or referenced relative to planes and/or axes, as described FIG. 1. Thus, in the rest of the description, the following terms are used:

"median plane" PM, PMA or PMB: any plane normal to the propulsion device 30, separating a port half from a starboard half of the device 30, said halves not being necessarily equal;

"transverse plane" means any plane normal to a median plane, separating the propulsion device 30 in two halves, one having the bow 31P said device 30 and the other one comprising the stern 31S of the latter, said halves not necessarily equal;

"longitudinal plane" means any plane normal to the transverse and median planes, said longitudinal plane separating an upper half and a lower half of said device 30, said halves not necessarily being equal;

"transverse axis" AT: any axis belonging to both a transversal plane and a longitudinal plane of the propulsion device 30;

"longitudinal axis" G: any axis belonging both to a median plane and a longitudinal plane of the propulsion device 30;

"central axis" AM: any axis belonging to a median plane and a transverse plane of the propulsion device 30.

The propulsion device 30, described in connection with FIGS. 1-7, includes a nozzle assembly cooperating with the platform 31. As used herein, the term "nozzle" refers to a conduit member profile that imposes a speed increase to a flowing fluid. This increase of fluid speed is typically due to a difference in dimension between the inlet and outlet sections of the nozzle element, with the output section having lesser or reduced dimensions compared to that of the input section.

Thus, as indicated in FIGS. 1, 2, 2A, and 3, the main body or the platform 31 of the propulsion device 30 is coupled to two nozzles 33A and 33B, which are rotatably mounted to provide rotation along a transverse axis TA, and project on a longitudinal plane of the propulsion device 30 that is normal to the longitudinal axis AL. Said nozzles 33A and 33B are respectively positioned at port and starboard sides of the device propulsion 30.

Figure 2A:
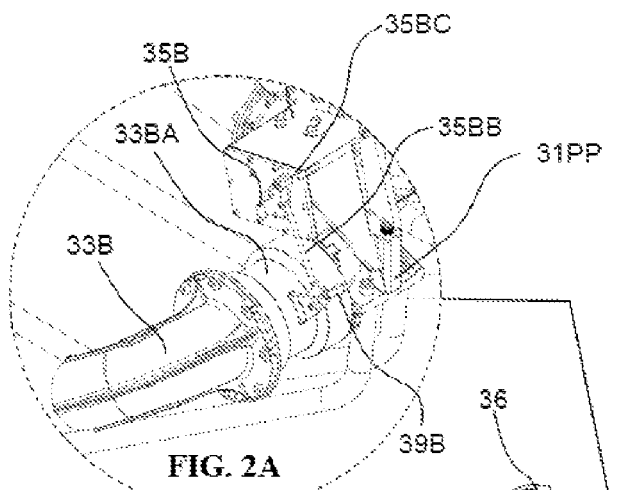
FIGS. 2 and 2A respectively describe a side view and partial enlargement of the framework of a non-limiting example of a propulsion device according to the present disclosure.
Figure 2:
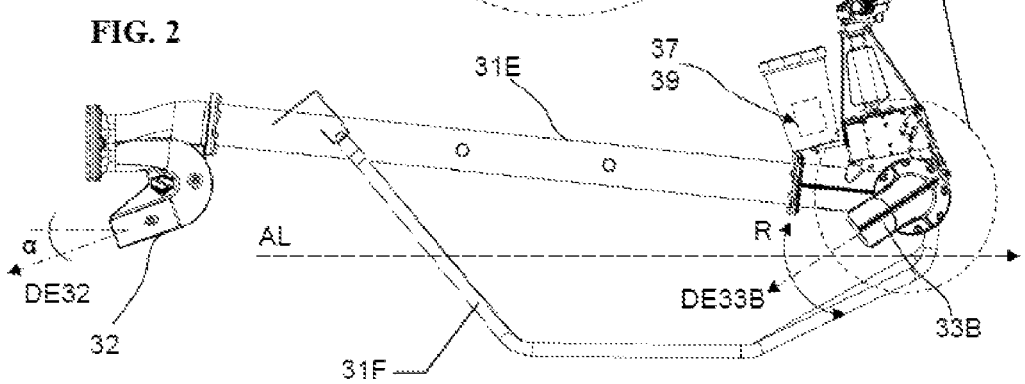

As shown in FIG. 2A (which shows a partial enlargement of FIG. 2), the nozzle 33B located on the starboard side of the propulsion device 30 includes a hollow tube that bends substantially ninety degrees. Such a tube may cooperate in a recessed connection, for example by bolting or welding as shown in FIG. 2A, with an arm 33bA that is also substantially straight and hollow, having a circular section substantially identical to that of the secondary nozzle with which it cooperates, in this case the nozzle 33B. Said arm 33bA also is also pivotably coupled with a first distal portion 34D of the means for distributing a pressurized fluid.

Also, the secondary nozzle 33A located at the port side of the propulsion device 30 is coupled (similar to the nozzle 33B) with a substantially straight arms 33AA with a circular section and identical to that of said secondary nozzle 33A. Said arm 33AA cooperates in turn according to a mechanical connection with a pivoting second distal portion 34D of the means for dispensing a pressurized fluid. The two secondary nozzles 33A and 33B, as shown in FIG. 3 in particular, may well advantageously be arranged in mirror images of each other with respect to either side of a median plane PM of the propulsion device 30, thereby substantially separating the latter into two halves of volumes and/or respective similar weight.

The means for distributing the pressurized fluid 34D may advantageously consist of a hollow structure of a substantially 'Y' or 'T' shape. Of this manner, said means 34D may deliver fluid (via first and second distal portions in a symmetrical longitudinal plane PL of the propulsion device 30) to the two secondary nozzles 33A and 33B via said arms 33AA and 33bA from a single proximal entry coupled to the remote pressurization station and/or supply duct 2 via coupling 34C. As indicated in FIGS. 1 and 2, said means 34D can be integrated with the beam or the main element 31E of the platform 31.

To change the orientation of each secondary nozzle 33A and 33B in two planes respectively (median planes PMA and PMB), the propulsion device 30 may include two actuators 35A and 35B respectively associated with said nozzles 33A and 33B as shown in FIG. 2A. The actuators may be in the form of an electric motor with a cam axis of movement as shown in FIG. 2A. Said cam cooperates with the arm 35BA, and thus indirectly with the nozzle 33B via a connecting rod 35BB whose ends cooperate respectively through pivotable links with the mechanical cam and arm 33bA. In this manner, rotation of the shaft 35BB by the actuator causes a rotation of the output fluid trajectory DE33B of the nozzle 33B in a median plane of the propulsion device 30. The second secondary nozzle 33A operates similarly, as shown in FIG. 3, with an axis of an actuator 35A via a connecting rod 35AB. So, two secondary nozzles 33A and 33B can be oriented and operated independently from each other, under the action of actuators 35A and 35B, while being jointly supplied with pressurized fluid from the means 34D via the respective arms 33AA and 33bA.

Said actuators 35A and 35B may be controlled by a processing unit 37 responsible for ensuring total control of the thrust and trajectories of the propulsion device 30 by operating jointly with control settings and input from sensors. As such, each actuator 35A or 35B, or more generally each secondary nozzle 33A or 33B, is associated with a sensor (not shown in the figures) responsible for issuing to said processing unit 37 a digital or analog representation of the angular position of the fluid ejection direction DE33A or DE33B. Other sensors such as an accelerometer, a gyroscope and/or an altimeter, may be included and operated to inform said processing unit 37 on movement or the relative position under the water surface or above where the propulsion device 30 operates. One or more other sensors can also measure the volume, flow rate, and or pressure of the pressurized fluid circulating in the distribution means 34D and transmit such measurements to said processing unit 37.

As shown in FIGS. 1 to 7, such a propulsion device may include a man-machine interface or user input 36, which may include a handlebar-type system having two handle surfaces 36A and 36B that receive/translate gestures and input made by a user U1 of said propulsion device into directional instructions. Such an interface 36 may be movably mounted along a substantially median axis AM as a handlebar of a watercraft, or substantially fixed associated with a sensor 36S (not shown in FIG. 3), with said sensor 36S responsible for measuring the rotation/steering effort or torque input about said center axis AM applied via the handles 36A and 36B through which the passenger U1 seeks to input an orientation setpoint for the device. Such a handlebar 36 can be associated with a plurality of human-machine interfaces such as control levers/switches 38A and 38B, as shown by way of non-limiting example in FIG. 3, to translate a pressurization power setpoint, an altitude setpoint, trim input, etc.

The disclosure is not limited to these examples of sensors and/or man-machine interfaces, as described by FIGS. 1-4. Other man-machine interfaces for inputting or outputting information, including visual, audible, or tactile modalities, which may be disposed on said handlebar 36 or any other part of said propulsion device 30.

The thrust/pushing assembly to move said propulsion device 30 includes, in addition to nozzles 33A and 33B, a main nozzle 32 cooperating with the platform 31 and means for supplying the pressurized fluid 34D, or such as in particular shown in FIGS. 1 and 2, with means for collecting the pressurized fluid 34C. Such a main nozzle 32 essentially provides the function of propulsion, and the secondary nozzles being positioned sideways (that is to say on both sides of the median plane PM of the propulsion device 30), and so are primarily responsible for steering the trajectories of that device 30.

According to FIGS. 1-7, the main nozzle 32 is positioned at the stern 31S of the propulsion device 30 and has a fluid outlet trajectory DE32 that curves from a direction towards the bow 31P and curves rearwards towards said stern 31S. Such geometry advantageously contributes to the displacement direction being substantially parallel to the surface of the fluid above which the propulsion device 30 travels. Alternatively, or additionally, such a propulsion device may comprise a plurality of main nozzles.

As indicated in the non-limiting example illustrated by FIG. 1, said main nozzle 32 can be coupled to and/or integrated with the body or platform 31 of the propulsion device 30 and/or coupled to and/or integrated with the means for collecting the fluid pressurized 34C. Such a coupling allows installation of the main nozzle 32 with the platform 31 to eliminate movement between said main nozzle 32 and said platform 31. According to another alternative, the fluid outlet of said main nozzle 32 could be mounted under the platform 31. In all cases, the direction of fluid outlet DE32 of the main nozzle 32 is located in a median plane PM, said median plane including a longitudinal axis G of said propulsion device 30. As depicted in FIG. 2, the fluid is thus expelled from the main nozzle 32 according to an angle $\alpha$ in relation to the longitudinal axis AL. The angle $\alpha$ between the direction of fluid expulsion DE32 and said longitudinal axis AL is advantageously between 0° and +45° to ensure a rapid and optimal movement from the fluid surface to free flight of the propulsion device 30. When the value of the angle $\alpha$ is substantially zero, the fluid outlet direction DE32 is substantially coincident with the longitudinal axis AL. When said angle $\alpha$ is greater than said fluid ejection direction DE32, fluid is directed towards the surface of fluid above which said propulsion device 30 operates. The angle $\alpha$ may be fixed or alternatively be selectively adjustable via an actuator (not shown in the FIGS. 1-7) and the processing unit 37.

The primary nozzle 32 may be made from a hollow body and curved to have a substantially circular to an elongated oblong shape as shown FIGS. 1 and 2. The term 'elongated' refers to an elongate form that has length larger than its width and whose angles are rounded. This particular configuration allows for decreased pressure losses from a pressurized fluid source used with the propulsion device 30 and a tenfold increase of the performance of such a propulsion device 30.

Unlike some known propulsion devices having thrust nozzles positioned above a center of gravity of the device to remove any physical effort of the passenger, e.g., purports to create an impression of being 'carried' by a hook by a virtual crane at the expense of the ability to move said passenger, the main nozzle(s) and secondary nozzles of the thrust assembly of the propulsion device 30 are positioned below said center of gravity of the device 30. The propulsion device 30 thus keeps all degrees of freedom to move and ride naturally, without effort or danger, with or without the assistance of the processing unit as disclosed herein with respect to FIG. 10. Thus, agility or intrinsic physical ability of a passenger are no longer criterion for success and achievement to use the device 30.

Figure 6:
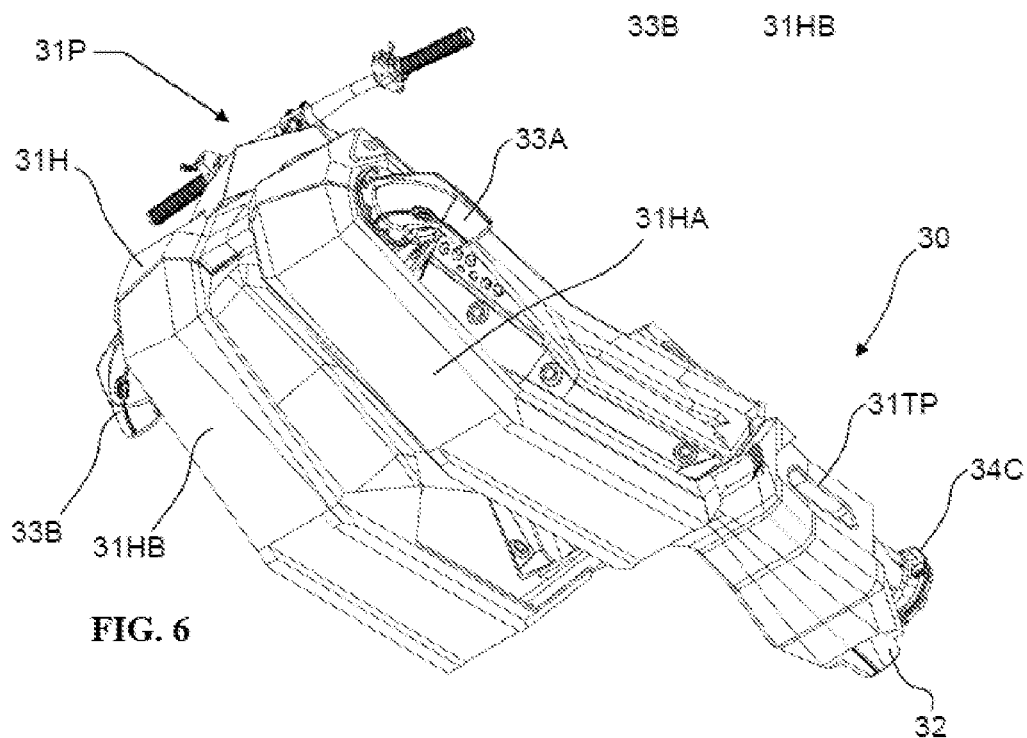
Figure 7:
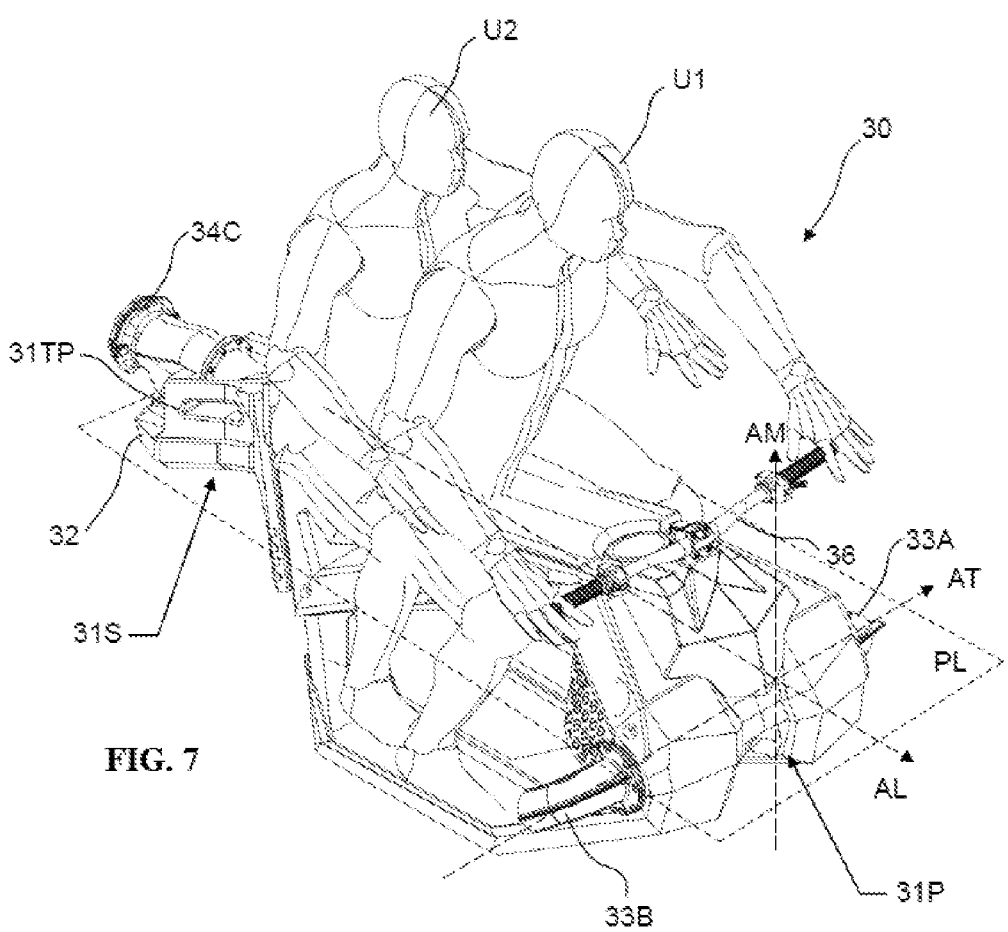
FIG. 7 illustrates a non-limiting example of a propulsion device carrying two passengers according to the present disclosure.

The platform 31 of a propulsion device according to the disclosure advantageously comprises, as shown in FIGS. 5-6, a fairing compound 31H of one or more elements. According to the non-limiting example described with said figures, such a fairing envelopes one side hand of the platform 31 and also the means of distribution 34D of pressurized fluid (except for the side nozzles side, which remain perfectly rotatably R as described previously in connection with FIGS. 2 and 2A). In addition, such fairing does not involve the main nozzle 32 and the collection means of said pressurized fluid 34C, which, as indicated in FIGS. 1 and 4, consists of an opening of circular section arranged to accommodate the distal portion 2a of a conduit 2 to route pressurized fluid from a remote pressurization station. Said fairing 31H circumscribes the man-machine interfaces 36, 38A, 38B to allow the main passenger U1 to interact with the processing unit 37, while protecting the components from contact with the liquid medium in which or above which the propulsion device 30 is intended to operate. Such protection may consist of a waterproof case to in which sensitive electronic components are integrated. In one example, the fairing 31H offers a seat or saddle 31T, as shown in FIG. 5, which can be relatively similar to that fitted to a personal watercraft for example. In this way, as shown in FIG. 7, one or two users U1 and U2 can take position on said device 30. To protect the feet of passengers U1, U2, the shroud 31H is arranged together with the platform 31, specifically with the tubular structure 31F, to form two lower longitudinal supports 31ha and 31hb, in the form of a "U" with a flat central section to support one of the legs of a passenger U1 or U2.

Other configurations of said fairing may also be considered. That described in FIGS. 5 and 6 reduces the volume and surface area immersed when the propulsion device is partially immersed, similar to a catamaran. In addition, each foot support has a portion inclined towards the bow 31P to reduce the force possibly experienced when the device 30 faces the fluid surface over which it moves or when any landing. The fairing 31H may be made out of one or more materials having, alone or in combination, sufficient rigidity to support the weight of the U1 and U2 and thereby prevent passengers from excessively deforming the fairing during the use of the device 30. Such materials may include glass, polymers, or carbon fibers braided and/or mixed with one or more resins, or more generally any other inert material suitable for use in water or fluid.

One of the objectives of a propulsion device 30 according to the disclosure is to allow passengers to easily move on the surface of a fluid, such as the surface of a sea or a lake. For this, passenger U1 and/or U2 may be able to take a position on said device 30, as shown in FIG. 7, so that said device is positioned in said fluid (that is to say partially immersed). Such a device may thus include buoyancy elements 31B, arranged and arranged to partially maintain said bow 31P of the device 30 at the surface of a fluid when the passenger U1 boards the device (such user having an average build, that is to say weighing about eighty to one hundred kilograms). Such buoyancy elements 31B can be made from one or more materials such that as non-limiting examples, a syntactic foam or a polyurethane foam. Such an arrangement facilitates the step of "take off" by providing an optimal balance optimal for the passenger. The fairing 31H may have openings through the wall of the shroud having conical shapes aligned along longitudinal axes substantially parallel to a median axis AM of the propulsion device 30, and whose upper cross-sectional ends have dimensions sections smaller than those of lower ends of said openings. As such, the fluid in which the device 30 is partially submerged in can easily drain via gravity, quickly easing the weight of said propulsion device 30 during takeoff. Said fairing 31H can further include openings or protrusions 31TP, providing a passenger U1 or U2 with grips/handle points in order to grasp the propulsion device 30 while it takes off. FIGS. 6 and 7 thus illustrate a lateral opening 31TP in the shroud 31H, 31S allowing the passenger U2 to cling to if necessary.

So that the propulsion device 30 may optionally and advantageously assist a passenger, either automatically or on demand, a functional architecture is shown in FIG. 8 with components to target and/or control the operation of said propulsion device which make it possible to implement a control method of the secondary nozzles of the propulsion device 30, and assist or control the trajectories, planes, and altitudes in response to instructions from the user, or even a remote party of said propulsion device 30 (such as an instructor, for example), said instructions being filtered under an operating context customizable to retain and translate relevant inputs and information with the processing unit 37 of propulsion device 30.

In association with FIGS. 3 and 8, propulsion device 30 may provide automatic assistance to its use via a processing unit 37 in the form of one or more microcontrollers or processors or digital/analog signal converters. Said processing unit 37 may issues driver commands CdA and CdB to actuators 35A, 35B to rotate the secondary nozzles 33A and 33B respectively associated with said actuators 35A and 35B. To deliver such control commands CdA, an exemplary implementation of a method for controlling said secondary nozzles may include the main steps S11, S12, S20, S31 and S32 (as illustrated in FIG. 8) implemented with the processing unit 37 that can advantageously interpret and/or execute instructions of a product program computer P, whose instructions are preloaded or included in a program memory 37MP which is in communication with the processing unit 37 via a communication bus. The processing unit 37 may further include or cooperate with program memory 37MP and data memory 37DM to collect data issued by other components, for example, sensors and/or man-machine interfaces as described herein. Such data memory 37DM can further register one or more configuration parameters that limit the degrees of freedom or operation desired for a particular user of the device 30. By way of non-limiting example, such configuration parameters can include thresholds or limits, for example, on a height/altitude and/or a maximum speed for a passenger having a medium build controlling said propulsion device 30.

As mentioned above in connection with FIGS. 1, 3, and 4, in particular, said user U1 can inform the processing unit 37, for example by an input, a desired directional change or altitude change. For this purpose, the propulsion device 30 has a first man-machine interface 36 that may be in the form of a handlebar watercraft or motor bicycle. The rotating running or torque applied to said handlebar 36 by the user U1 driver can be measured by a suitable sensor 36S, by example an inductive sensor (and/or preferably a Hall effect sensor being particularly accurate thanks to its amplification function of the measurement signal limiting and any noise from the environment). A signal C36 supplied by such a sensor 36S may be considered as indicating a desired change of direction in the form of an angular position, such as to generate a roll resulting from a change of path for a given altitude. Said handlebar 36 may further comprise other two interfaces 38A and 38B, for example in the form of levers, switches, or buttons that a user U1 can inquire or respectively operate to for a desired increase or decrease in power/pressurized fluid delivery from the remote pressurized fluid station that feeds said propulsion device 30 with pressurized fluid, and an increase or decrease desired altitude with respect to a height of determined nominal cruising through a configuration parameter stored in a memory 37DM or 37PM. Such levers 38A and 38B may, like the stroke of the handle 36, be respectively associated with sensors and 38BS 38AS, by such as Hall sensors. The sensor 38BS may be arranged to output a signal C38B expressing a growth of amplitude and/or decay the pressurization power of the pressurization station 40. The remote 38AS sensor may be arranged to outputting a signal C38A expressing a desired altitude change or "trim" in terms of nominal altitude or "cruise" such as an angular position to cause a pitching resulting from a change of altitude in relation to a nominal plane substantially horizontal thereto.

Other sensors could alternatively and/or further be associated with other interfaces. Such interfaces could themselves directly output data or signals characterizing the user's instructions for the propulsion device 30. To control the plane and/or the current path with respect to a plane and nominal path, the processing unit 37 cooperates advantageously by wire or wireless means, with one or more sensors 39, preferably a set of sensors, such as gyroscopes, three axes for defining at each instant the current position of the propulsion device 30 through the accelerations and magnetic fields they undergo. Such a set of preferred sensors, equipping such aircraft is known as the AHRS acronym for "attitude and heading reference system" or "inertial" guidance. Said sensor 39 operates via vibrations to measure changes in direction or the acceleration of gravity to provide a vertical reference. Such sensors 39 thus deliver and translate two types of signals or data—a roll measurement C39r and a pitch measurement C39p, said pitch and roll being experienced by the propulsion device 30.

Knowing the measurements of roll and pitch of propulsion device and a setpoint "trim" or change of direction, the processing unit 37 may implement a control method for the secondary nozzles 33A and 33B to try to bring said propulsion device 30 to a plane substantially horizontal and straight directionally. A roll can thus be seen as a position error angle described by the base of a longitudinal plane PL of said propulsion device 30 about a longitudinal axis G of the propulsion device 30. The same applies to a direction changing setpoint which can be seen as a position error with respect to the current plane. Thus, the processing unit 37 can implement step S11 to generate a command Cr for driving a difference in the relative positions of the secondary nozzles 33A and 33B, likely to cause itself a change of direction and thus automatically correct the current plane. The Cr command can be advantageously produced by implementing in step S11 a PID controller (Proportional, Integrator, Differentiator), allowing an automatic servo trim of propulsion device 30, taking as input or set value on one hand, the set value C36 describing a position of the handlebar 36 or a torque applied thereon resulted in the sensor 36S in an angular position facing said longitudinal axis AL compared to a longitudinal plane PL of said device substantially horizontal to the other, and the signal or data C39r indicating a measure of the roll delivered by the sensor 39. Any other function or algorithm could be implemented alternatively or in addition to step S11.

Furthermore, a pitch can be seen as an angular position error described by the base of a longitudinal plane PL of said propulsion device 30 about a transverse axis TA of said device drive 30 relative to a plane substantially horizontal thereto. It is the same for a set elevation change that can be seen as an error in angular position with respect to the current plane about a transverse axis AT of said propulsion device 30. Thus, the processing unit 37 may implement a step S12 to produce an order Cp modification of a mean position of the nozzles side to cause a change above sea level and thus correct the current plane. The Cp command can be produced by the implementing in step S12 a PID controller (Acronym for "Proportional Integrator, Differentiator") allowing servo control of the plane PL of the propulsion device 30 taking as input the instructions C38A on the one hand, which describe a position of the lever 38A translated by the sensor 38AS at a position angled with respect to said transverse axis AT relative to a plane of a substantially longitudinal plane PL, and on the other hand, the signal or data C39p reflecting a measure of pitch delivered by the sensor 39. Any other function or algorithm could be implemented alternatively or in addition in step S12.

To automatically correct for or cancel roll and pitching while incorporating any instructions to change direction and/or altitude transmitted by user U1, the nozzles 33A and 33B may be further controlled by unit 37 to include step S20 to produce instructions CmA and CmB to steer nozzles 33A and 33B, respectively. By way of example, such step S20 can include generating CmA to control steering of the secondary nozzle 33A, that is to say the secondary nozzle 33A rotatably mounted about a transverse axis TA and positioned on the port side of the propelling device 30 described in connection with FIG. 1, by summing the command Cr to cause a deviation of the relative positions of secondary nozzles 33A and 33B and control modification of a mean position Pc of the nozzles secondary. Said step S20 may include controlling steering of the secondary nozzle 33B, that is to say the secondary nozzle mounted to rotate about a transverse axis AT and positioned in the device of starboard propulsion 30 described in connection with FIG. 1, in subtracting the command Cr to cause a difference of relative positions of the secondary nozzles 33A and 33B with command Cp to modify a mean position of said secondary nozzles 33A and 33B.

To ultimately drive the actuators 35A and 35B for movement of said secondary nozzles 33A and 33B, in holding joint current account positions said secondary nozzles 33A and 33B and said control commands CmA and said respective secondary nozzles 33A and 33B previously produced step S20, the control process implemented by the processing unit 37 and described in connection with FIG. 8 may advantageously comprise two steps S31 and S32 for respectively outputting CdA and CoB commands, for example, speed or position, depending on the type considered, to actuators 35A and 35B, which then move the secondary nozzles 33A and 33B about a transverse axis AT of said propulsion device 30. By way of preferred example and without limitation, step S31 to deliver the CdA control of the actuator 35A controlling the secondary nozzle 33A positioned on the port side of the propulsion device 30 may include controlling said actuator 35A by implementing a corrector PID taking as input, on the one hand, the angular measurement MA of an axis of said actuator 35A and/or angular position of the nozzle 33A in relation to a reference issued by the sensor 39A, and the other, said control command CmA generated previously in step S20.

S32, concurrent to step S31 previously described, delivers the PID control output to actuator 35B driving the secondary nozzle 33B positioned on the starboard side of the propelling device 30, which thereby operates the actuator 35B by implementation of the PID controller taking as an input, one hand, the angular measurement MB of an axis of said actuator 35B and/or the angular position of the nozzle 33B with respect to a given reference issued by the sensor 39B, and secondly, said drive control CmB previously generated at step S20. The exemplary nozzles control method described may include other intermediate steps to consider other measures, such as the pressure of the fluid supplied to the thrust assembly 32, 33A and 33B of said device 30 or other additional instructions, for example, an instruction to change altitude and/or to effect a nominal planar orientation.

It is noted that in the absence of any direction change setpoint and/or altitude recorded by the user, the implementation of the method of steering of the secondary nozzles allows automatic compensation for any pitch and/or roll, thus providing steering assistance and unparalleled comfort for passengers. Furthermore, a propulsion device 30 described in association with FIGS. 2-8 may comprise a setpoint interface 38B for changing the power/delivery of the remote pressurization station that provides the pressurized fluid to the device 30 via conduit 2. As a non-limiting example, the processing unit 37 may in consider the setting C38B of user U1 input via the interface 38B, translated by the associated sensor 38BS, as a possible power determined by a nominal configuration parameter, to then provide a signal CD40 to control the remote pressurization station 40. Such control can be transmitted through the air via a wireless communication, or alternatively through communication means 37C in communication with the processing unit 37.

A take-off phase and, to a lesser extent, a landing phase may be difficult for a beginner or intermediate user U1 of the propulsion device 30. The features disclosed herein provides particularly valuable assistance during these automatic critical phases.

Thus, to prepare a takeoff, a first passenger U1 and/or a second passenger U2 must first take a position on the seat 31T. When the propulsion device 30 is partially submerged and the engine of the remote pressurization station is at a low RPM/rate, although the buoyancy means 31B helps such passengers or U1 and/or U2 to retain their positions on the seat 31T, the balance of the device before takeoff can seem insecure or cause anxiousness for some novice riders.

Once the pilot-passenger U1 operates the interface 38 or the throttle (that is to say, allowing the interface to control power of the remote pressurization station), or as soon as the plane of said propulsion device is abruptly altered by the loading of a passenger, processing unit 37 may provide automatic assistance during a specific adjustable time, for example a time period of approximately twenty seconds, to provide excellent stabilization of the propulsion device 30. Such a result can be obtained as a result of the processing unit 37 acting jointly on the power of fluid delivery by the remote pressurization station and the orientation of the secondary nozzles. For this, said processing unit 37 may taker into account the pressure of the fluid flowing in the means for supplying 34D to the main nozzle(s) and secondary nozzles. This information can be provided by one or more sensors (not shown in FIGS. 1-7), as mentioned above. Said fluid pressure will thus constitute, for the unity of processing 37, a parameter adjustment function implemented in steps S11, S12, S31 and/or S32 described in connection with FIG. 8. Specifically, when fluid pressure supplied to the thrust assembly of the propulsion device 30 is low, it is relevant to increase the sensitivity of the control method for the secondary nozzles to appropriately address pitch and/or roll. However, when the pressure of said fluid is high, for example when the device has a cruising trajectory, sensitivity of said secondary nozzle control methods may be reduced to limit sudden and excessive corrections of said roll and pitch felt by the passenger U1.

Returning to the take-off phase, when said pilot-passenger U1 is operating the interface 38 (or any other instrument dedicated or included with this interface) moderately, for example, below a determined power or thrust threshold and is ready to take off, the processing unit 37 may implement the secondary nozzle control method 33A and 33B and automatically trigger an increase in the pressurization power of the remote station. The latter is sufficient for the propulsion device 30 to emerge completely up from the water and achieve a pitch, by way of non-limiting example, of the order of 10° to 15° with respect to the horizon. At this stage, the power takeoff is complete and the control method of the secondary nozzles may resume for nominal operation of the device. The base of the propelling device 30 thus quickly recovers (in a matter of seconds) a perfectly horizontal orientation. The disclosed device and methods may provide at this stage an output generated by the processing unit 37 indicating implementation of the method of management of the secondary nozzles, whether by sound alerts and/or visual or vibration alerts. Such a signal/alert informs the passenger U1 that he now has some measure of piloting control as opposed to an autonomous take-off phase and operation not requiring any user input or control.

Alternatively, and/or additionally, such automatic assistance may provide that the nozzle control methods cause the issuance of a second signal or alert (whether through audible, visual, or tactile modalities) alerting said pilot-passenger U1 a breach of a safe takeoff procedure and control. This can result from excessive and premature biasing the throttle control and/or control of the remote pressurization station, via the interface 38B for example, or an attempt to impart one or more excessive changes of desired trajectories, via the interface 36 by example, during the power takeoff. This second signal may indicate to the user U1 that due to the undesirable or excessive control inputs, the device has reduced the level of the fluid requested from the pressurization station feeding the thrust group thrust of the propulsion device 30, and has biased or reduced the input from the handle 36 below one or more predetermined thresholds. In the meantime, the propulsion device, under the action of the processing unit 37, may automatically pursue a default low-speed travel, altitude, and attitude determined to be safe.

Concerning splashdown, the present disclosure provides control methods for the secondary nozzles that can automatically assist the user U1 when requesting landing. This can be detected by the processing unit, for example, triggered by a specified period of time during which the user has let go of the throttle or input (generally known by the term "dead man detection"). In this case, so that the propulsion device 30 does not violently fall and impact the surface of the fluid being flown above, the processing unit 37, via the implementation of a control method of the secondary nozzles as disclosed herein, transmits a command for reducing the pressurization power of the fluid being delivered to the thrust group by the remote pressurization station and modifies orientation of the nozzles 33A and 33B to first regain altitude and speed displacement corresponding to those achieved at the end of the power take-off phase, and subsequently to cause a soft landing. The take-off phases and/or assisted landing phases and control are of course optional. Their implementation and settings may result from setting the operation of the control methods of the secondary nozzles in accordance with the principles disclosed herein.

The embodiment described in connection with FIG. 8 with a propulsion device 30 may advantageously allow a remote instructor, by example positioned on the pressurization station 40 or on a quay or on a nearby boat, to control the operation of the propulsion device 30 instead of the user U1. For this, the means 37C may receive a communication message override C40 interpretable by the processing unit 37 of the propulsion device 30. Such priority control message C40 can convey instructions similar to flying instructions C36 and instructions C38A mentioned above. Said instructions C40 conveyed can otherwise mimic the control method of the secondary nozzles previously described instead of the input and control produced via the interfaces 36 and 38A. Thus, an instructor can intervene on request as needed or desired during the operation of a beginner passenger U1. Furthermore, the processing unit 37 may include or cooperate with one or more power electric sources 37PS, charged with an electricity supply to activate the processing unit itself and/or sensors or actuators disclosed herein.

Finally, the processing unit 37 can record a history of instructions and/or received pilot controls, or even location data optionally delivered by the sensor 39 for purposes of monitoring or controlling the use of the propulsion device 30 according to the present disclosure. Such a history can be saved in the memory 37DM and be readable from a communicating electronic object, such as a computer, a smart mobile phone, and/or interactive tablet for consultation. Such communication may further enable to ability to modify the program P recorded in the program memory 37PM and/or certain stored configuration parameters in said data memory 37DM in order to modify, on demand, the behavior of the propulsion device 30 and the automatic assistance delivered by the latter. It is thus possible to modify all or part of the instructions and/or data parameters used by product program P that implements the control methods of the secondary nozzles with the processing unit 37. Such communication may be implemented through the means of communication referred to above or via other means of possible communication dedicated to this purpose.

Figure 9:
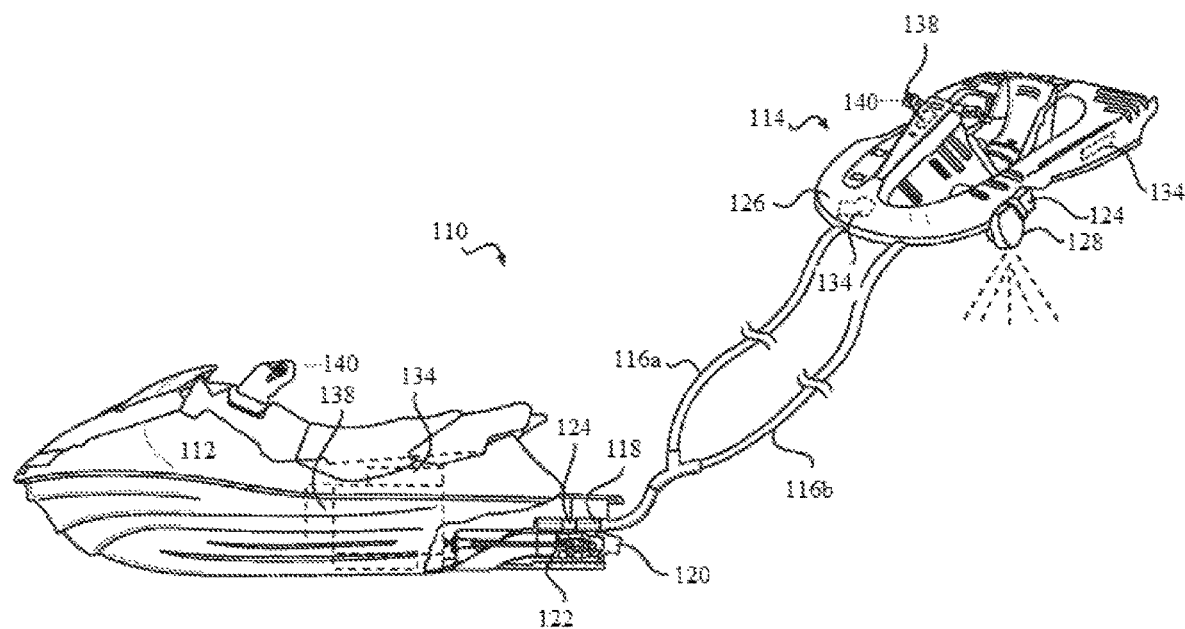
FIG. 9 is an illustration of an example of a pressurized-fluid flight system constructed in accordance with the principles of the present disclosure.
Figure 10:
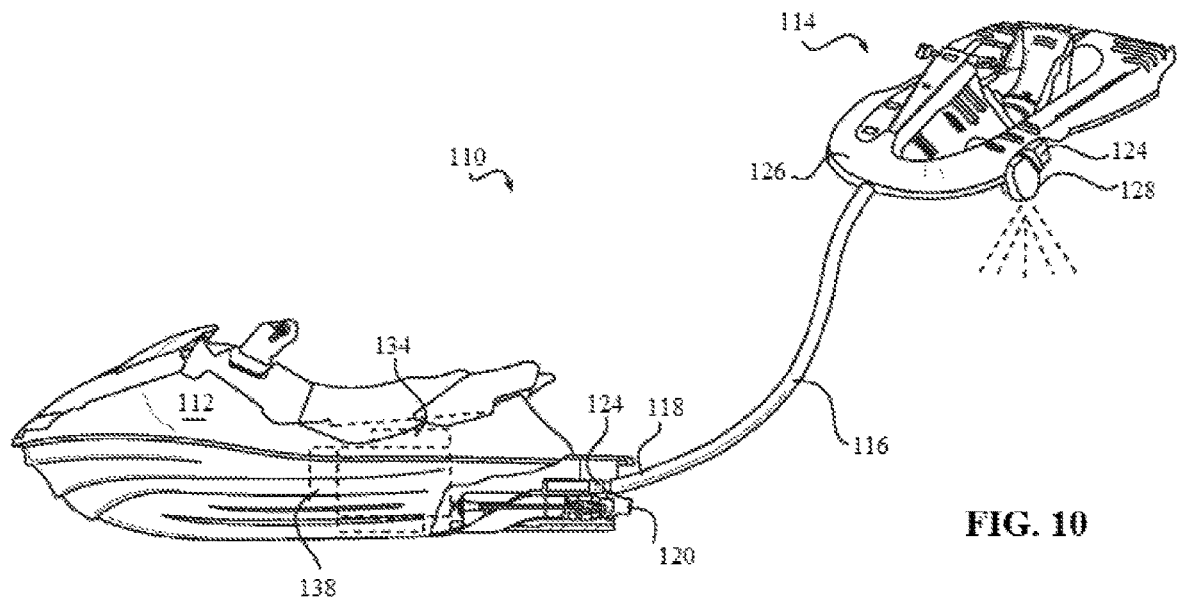
FIG. 10 is an illustration of another example of a pressurized-fluid flight system constructed in accordance with the principles of the present disclosure.

Now referring to FIGS. 9-10, additional examples of a personal propulsion system are shown, generally designated as '110', that may generally include a pressurized fluid source 112 and a personal propulsion device 114 having, or coupled to, one or more fluid delivery conduits 116.

The pressurized fluid source or unit 112 may include an unmanned marine unit having a substantially water-tight and/or wave-piercing hull (operable on a water surface and/or submersible—examples of which are set forth in U.S. Pat. No. 7,258,301, the entirety of which is hereby incorporated by reference), a boat, a personal watercraft such as a wave runner or jet ski configured to transport passengers thereon, or a pump or compression station that may be located on land or in/on water.

The pressurized fluid source 112 may include a plurality of fluid discharge ports to provide pressurized fluid to one or a plurality of personal propulsion devices 114. Simultaneous use or operation of multiple personal propulsion devices 114 maybe desirable, for example, in a theme park setting, during an exhibition or competition event, or the like where multiple personal propulsion devices 114 will be operated simultaneously. In an example where the pressurized fluid source 112 is a boat or personal watercraft, such multiple fluid discharge ports may not only provide for simultaneous use of a plurality of personal propulsion devices 114, but also provide one or more fluid discharge ports to controllably maneuver the boat or personal watercraft during use of the personal propulsion device 114.

For example, the pressurized fluid source 112 shown in FIGS. 9-10 (illustrated as a personal watercraft) may include a first fluid discharge port 118 that is coupled to the fluid delivery conduit 116 to provide pressurized fluid thereto. The pressurized fluid source 112 may also include or define a second fluid discharge port 120 that directs fluid out of a rear of the pressurized fluid source 112 to move the pressurized fluid source, for example, within a body of water. The second fluid discharge port 120 may be substantially similar to an exit nozzle and/or venturi configuration adjacent to an impeller 122 that is common to personal watercraft as the primary propulsion mechanism to move the watercraft in the water. The second fluid discharge port 120 may include steerable mechanisms to change a direction of fluid exiting the watercraft, as well as reverse thrust and braking mechanisms coupled on or about the second fluid discharge port 120. In one aspect, the pressurized fluid source 112 may include input controls 140. In one aspect, the personal propulsion device 114 may include input controls 140. The input controls 140 may be hand operated controls, foot operated controls, and the like. In one aspect, the input controls 140 may be configured as a remote control communicating to the system 110 over a wired or wireless communication channel as defined herein. In this regard, if the user is a beginner, a remote-controlled implementation may allow a teacher to control the system 110 for the beginner. The input controls 140 may be operated to provide mechanical, electrical, hydraulic, and the like inputs to control the personal propulsion device 114 and/or the pressurized fluid source 112. In one aspect, the input controls 140 may control at least in part the steerable mechanisms of the pressurized fluid source 112. In one aspect, the steerable mechanisms of the pressurized fluid source 112 may be controlled with one or more controllers, sensors, or other components of the system to provide the features and operations disclosed herein.

Fluid flow through the first and second fluid discharge ports 118, 120 may be selectively, and independently controllable, for example, by operation of the input controls 140. In one aspect, fluid flow through the first and second fluid discharge ports 118, 120 may be selectively, and independently controllable with one or more controllers, sensors, or other components of the system to provide the features and operations disclosed herein. For example, the pressurized fluid source 112 may have a single impeller 122 driven by a power source, such as a combustion engine or other means. The first and second fluid discharge ports 118, 120 may be positioned adjacent to the impeller 122, and one or more fluid control valves 124 may also be coupled to or placed in the fluid flow path of the first and second fluid discharge ports to allow a user to modify the fluid flow through the first discharge port 118 without affecting fluid flow through the second fluid discharge port 120, and vice versa.

Figure 11:
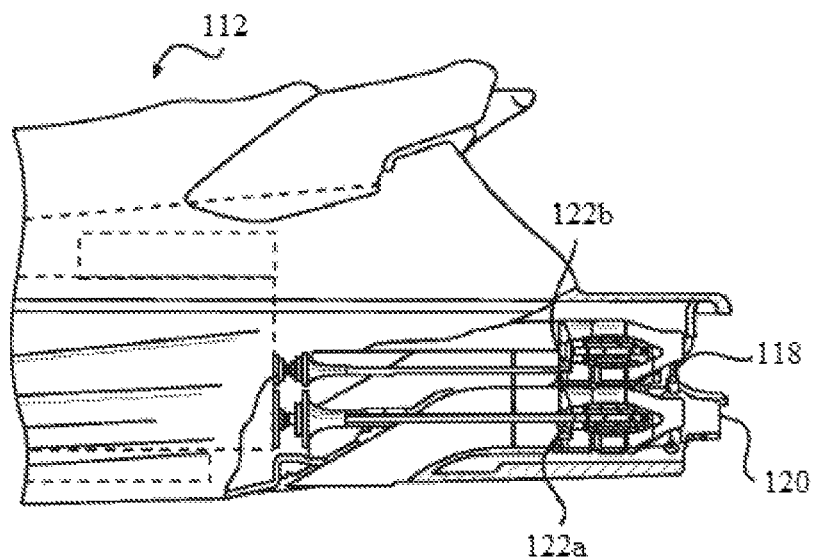
FIG. 11 is an illustration of an example of a pressurized fluid source constructed in accordance with the principles of the present disclosure.

In an alternative example, as shown in FIG. 11, the pressurized fluid source 112 may include a plurality of independently driven or controlled impellers 122a, 122b that separately provide pressurized fluid to the discrete fluid discharge ports 118, 120. Such an example may also include one or more fluid control valves 124 to maintain a desired pressure on either of the impellers 122a, 122b or to otherwise create optimal fluid intake and expulsion characteristics during operation of the system 110. In one aspect, the independently driven or controlled impellers 122a, 122b may be controlled with one or more controllers, sensors, or other components of the system to provide the features and operations disclosed herein. In one aspect, the independently driven or controlled impellers 122a, 122b may be controlled, for example, by operation of the input controls 140.

The system 110 may include one or more fluid control valves 124 disposed within a fluid flow path of the system 110 to adjust, control, or otherwise affect fluid flow at one or more points in the system 110, for example, by operation of the input controls 140. In one aspect, the fluid control valves 124 may be operated by with one or more controllers, sensors, or other components of the system to provide the features and operations disclosed herein. Such fluid control components 124 may include, for example, solenoid valves, flapper valves, ball valves, butterfly valves, or other mechanisms that can selectively and controllably adjust fluid flow. In one aspect, the valves may be controlled by actuators such as an electric motor, solenoid, pneumatic actuators which are controlled by air pressure, hydraulic actuators which are controlled by the pressure of a liquid such as oil or water, or the like. In another aspect, the valves may be manually operated. In either aspect, the valves may be controlled, for example, by operation of the input controls 140. In either aspect, the valves may be controlled with one or more controllers, sensors, or other components of the system to provide the features and operations disclosed herein.

The fluid delivery conduits 116 may include elongated, flexible hose bodies constructed of materials having sufficient strength to withstand high fluid pressures within, and may include such materials used or employed in the construction of fire hoses or other industrial fluid hose constructs, such as plastics, polymers, fabrics, ceramic components, and/or combinations thereof. The fluid delivery conduit(s) 116 may define an internal diameter sufficient to convey volumes of fluid requisite to operate the system as disclosed herein, which may be between approximately six inches and eighteen inches for example. The fluid conduit 116 may further define an elongated length allowing the personal propulsion device 114 to be operated a safe or desired distance from the pressurized fluid source 112 and/or providing a desired elevation or flight capability of the personal propulsion device 114. For example, the fluid conduit(s) 116 may have a length between approximately thirty feet and approximately eighty feet. The fluid delivery conduit(s) 116 may be engageable either directly to one or more fluid discharge ports 118, 120 of the pressurized fluid source 112, or be coupled to the pressurized fluid source 112 through one or more intermediary components, such as a "Y"-pipe, manifold, or the like, that can divide fluid flow from a single fluid discharge port to multiple fluid delivery conduits.

The example in FIG. 9 illustrates two flexible fluid conduits 116a, 116b extending to the personal propulsion device 114. The multi-conduit configuration can provide added stability to the personal propulsion device 114 during operation, during which the flexible fluid conduits 116a, 116b would have increased rigidity due to the pressurized fluid therein, thus providing two points of stabilization exerted on the personal propulsion device 114 that can resist or decrease excess yaw, pitch, and roll movements. In the example shown in FIG. 10, a single fluid conduit may extend to the personal propulsion device 114, providing increased maneuverability about one or more axes with respect to the single fluid conduit. The fluid conduits 116 may be coupled to the personal propulsion device 114 to form a joint or pivot point allowing movement between the fluid conduit(s) and the personal propulsion device. For example, the fluid conduit 16 may be attached to the personal propulsion device 114 through a hinged or pivoting assembly, or alternatively may include a multi-axis coupling, such as a ball-and-socket type of joint.

The personal propulsion device 114 may generally include one or more surfaces to support one or more passengers as well as fluid-propelled thrust features enabling the personal propulsion device to elevate and achieve flight through the expulsion of pressurized fluid. For example, the personal propulsion device 114 may include or define a platform 126 that is sized, shaped, or otherwise configured to support a passenger. The platform 126 may include a unitary construction or alternatively include the assembly of multiple components fixedly, releasably, and/or movably coupled together to provide the features disclosed herein. The platform 126 may be configured to support one or more passengers in a seated and/or prostrate position, and may include one or more seats, raised ledges or surfaces for seating, or the like. The platform 126 may include one or more cushioned portions and/or buoyant portions to provide comfort and safety to the passenger(s). In one aspect, the platform 26 may include the input controls 140.

The personal propulsion device 114 may include one or more components that employ or discharge pressurized fluid to provide or generate a force to aid in elevating, moving, stabilizing, and/or otherwise controllably using the platform 126. For example, the passenger assembly 114 may include one or more fluid outlets 128 coupled to the platform 126. In the examples shown in FIGS. 9 and 10, the personal propulsion device 114 includes a plurality of substantially downward-facing fluid outlets 128 having a nozzle-shape or configuration that discharge pressurized fluid received from the pressurized fluid source 112 to move, stabilize, elevate or otherwise direct or orient the platform 126 as desired, for example, by operation of the input controls 140. In one aspect, the pressurized fluid source 112 may move, stabilize, elevate or otherwise direct or orient the platform 126 with one or more controllers, sensors, or other components of the system to provide the features and operations disclosed herein. The fluid outlets 128 may be positioned about the platform 126 to provide a desired degree of stability and/or maneuverability. For example, the fluid outlets 128 may be attached to an underside of the platform 126, or extend from or be attached to one or more sides of the platform 126. As stated above, the fluid outlets 128 may include a nozzle shape to accelerate fluid ejection and increase a resulting thrust, and may have varying dimensions to achieve a desired thrust output. In one aspect, the thrust output may be controlled by the user, for example, by operation of the input controls 140. In one aspect, the thrust output may be controlled with one or more controllers, sensors, or other components of the system to provide the features and operations disclosed herein. In one aspect, during certain activities the thrust provided by the fluid outlets 128 may exceed the mass of the personal propulsion device 114 and at least a portion of the fluid conduit 116 to generate lift.

Figure 12:
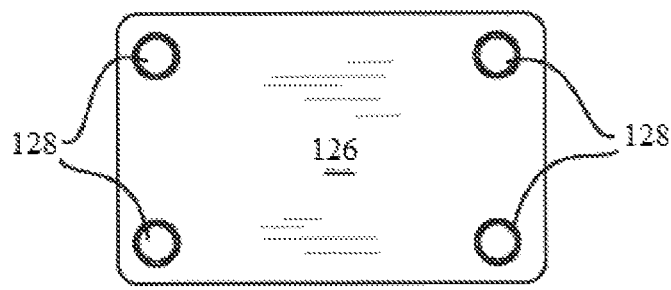
FIG. 12 is an illustration of an example of a fluid outlet configuration for a pressurized-fluid flight system constructed in accordance with the principles of the present disclosure.
Figure 13:
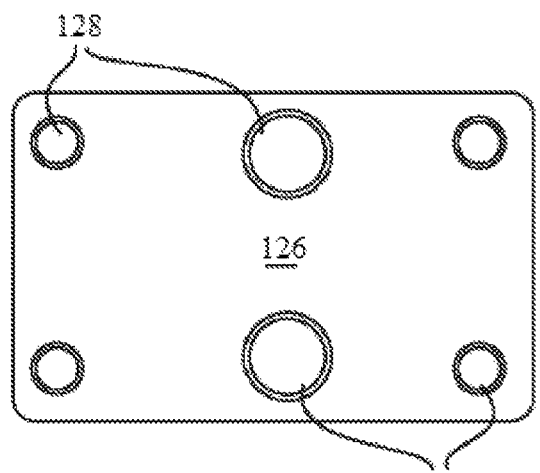
FIG. 13 is another illustration of a fluid outlet configuration for a pressurized-fluid flight system constructed in accordance with the principles of the present disclosure.

The fluid outlets 128 may be arranged in numerous, varying configurations. For example, the personal prolusion devices 114 shown in FIGS. 9-10 include two fluid outlets 128 positioned around a midsection of the platform 126. Alternative configurations may include four fluid outlets 128 placed substantially equidistant around a perimeter or point of the platform 126, as shown in FIG. 12; or six fluid outlets 128 of varying size, having two larger fluid outlets near a midsection of the platform and four smaller fluid outlets disposed around a larger area of the platform, as shown in FIG. 13. In other aspects, any number of fluid outlets 128 may be utilized. In other aspects, the fluid outlets 128 may be symmetrically arranged to provide stability. In some aspects, the fluid outlets 128 may discharge fluid generally vertically downwardly. In some aspects, the fluid outlets 128 may discharge fluid generally vertically downwardly each at an angle away from the platform 126 to increase stability.

The fluid outlets 128 may be configured in a static configuration with one or more preset dimensions (e.g., with a set opening circumference, length, or the like) and/or location on or with respect to the platform 126. Alternatively, the fluid outlets 128 may have characteristics or configurations that can be dynamically, selectively, and controllably adjusted during use of the system 110, for example, by operation of the input controls 140. For example, the fluid outlets 128 may be coupled to one or more actuators, motors, servos, or the like (collectively, 'actuators 130') that can modify or adjust at least one of a location, angular orientation and/or thrust direction, length, and/or fluid flow diameter of the fluid outlet 128. In one aspect, the actuator 130 may be controlled with one or more controllers, sensors, or other components of the system to provide the features and operations disclosed herein. The actuators 130 may, for example, include one or more electrical, mechanical, and/or pneumatic mechanisms, or combinations thereof, and may include linear, rotary, or other motion and movement patterns. The actuators 130 may be in communication with one or more controllers, sensors, or other components of the system to provide the features and operations disclosed herein.

Figure 14:
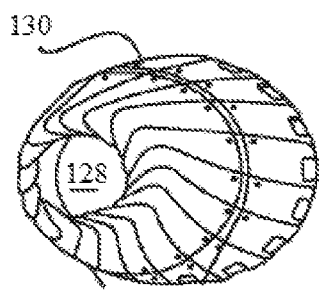
FIG. 14 is an illustration of an example of a fluid outlet actuator mechanism for a pressurized-fluid flight system constructed in accordance with the principles of the present disclosure.

In one example, an actuator 130 may be coupled to a fluid outlet 128 to selectively adjust and control a diameter of the fluid outlet to affect the rate of fluid flow therethrough, and thus affect a thrust force generated by dispelling fluid. For example, the actuator 130 may include a diameter constricting or reduction/expansion mechanism, such as an adjustable iris (an example of which is shown in FIG. 14), or may alternatively include a noose-like mechanism that constricts and relaxes a flexible segment of the fluid outlet to modify the diameter (not shown). Other constructions to adjust and control fluid flow are contemplated as well. In one aspect, the actuator 130 may be controlled by the user, for example, by operation of the input controls 140. In one aspect, the actuator 130 may be controlled with one or more controllers, sensors, or other components of the system to provide the features and operations disclosed herein.

Figure 15:
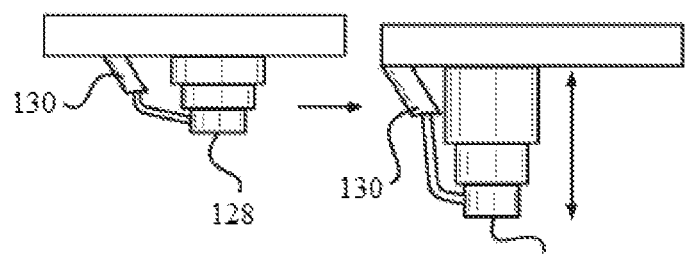
FIG. 15 is an illustration of another example of a fluid outlet actuator mechanism for a pressurized-fluid flight system constructed in accordance with the principles of the present disclosure.

In another example, an actuator 130 may be coupled to a fluid outlet 128 to selectively adjust and control a length of a tubing or nozzle body leading to the fluid outlet 128. For example, as shown in FIG. 15, the actuator 130 may be coupled to a telescoping construct of the fluid outlet 128 that can be selectively extended or retracted. Such a telescoping mechanism may also have stepped-down reductions in diameter along a length of its components, thereby allowing control of both length and diameter of the fluid outlet 128.

In another example, an actuator 130 may be coupled to a fluid outlet 128 to adjust its angular orientation and thus affect the direction that fluid is expelled. The fluid outlet 128 may include or be coupled to the platform 126 through a multi-axis joint (such as a ball-and-socket fluid coupling) to provide a wide range of available fluid outlet directions.

Figure 16:
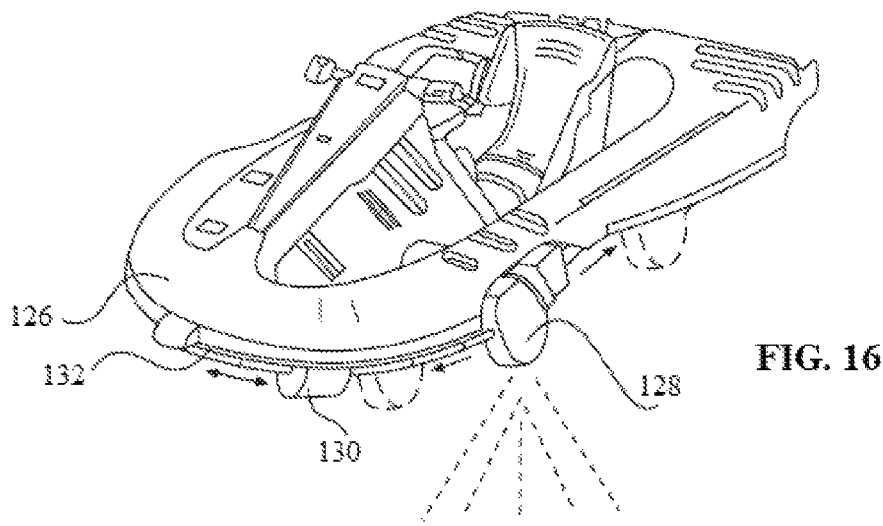
FIG. 16 is an illustration of another example of a fluid outlet actuator mechanism for a pressurized-fluid flight system constructed in accordance with the principles of the present disclosure.

In another example, an actuator 130 may be coupled to a fluid outlet 128 to modify a physical position of the fluid outlet 128 with respect to the platform 126 and/or other components of the personal propulsion device 114. For example, during use of the system 110, the fluid outlets 128 may be movable along a length or width of the platform 126. As shown in FIG. 16, the fluid outlets 128 may be movably coupled to and/or slidably disposed within a track or guide 132 that provides a range of locations that the fluid outlets 128 may be moved to. The track 132 may provide a plurality of discrete locations that a fluid outlet 128 can be set or locked into, or alternatively provide an uninterrupted length or dimension that one or more fluid outlets 128 can travel along. An actuator 130 can facilitate the movement of the fluid outlet(s) 128 to a desired position along the track 132 and may also be operated to secure the fluid outlet 128 into a desired position once the position has been attained. Individual fluid outlets may be movable independently of other fluid outlets, or may be moved in conjunction or coordination with other fluid outlets. In aspects, the actuator 130 may be implemented with an electric motor or solenoid, pneumatic actuators which are controlled by air pressure, or hydraulic actuators which are controlled by the pressure of a liquid such as oil or water. In another aspect, the actuator 130 may be manually operated. In one aspect, the actuator 130 may be controlled by the input controls 140. In one aspect, the actuator 130 may be controlled with one or more controllers, sensors, or other components of the system to provide the features and operations disclosed herein.

Fluid flow through any of the fluid outlets may be controllable independent of fluid flow through other fluid outlets. To achieve such independently controllable and adjustable fluid flow, fluid control valves 124 may be coupled to or otherwise placed in proximity to the fluid outlets 128, may be coupled to or otherwise placed in proximity to the fluid discharge ports 118, 120 of the pressurized fluid source 112, and/or may be disposed along a length of the fluid delivery conduit(s) 116. The fluid control valves 124 may be in communication with one or more controllers, sensors, or other components of the system to provide the features and operations disclosed herein.

The system 110 may include one or more sensors and/or diagnostic instruments 134 that measure, read, assess, or otherwise gather information about one or more features, conditions, and characteristics of the system 110 before, during, and/or after use of the system. For example, one or more sensors 134 may be coupled to the pressurized fluid source 112 to assess, measure and/or monitor an engine RPM, fluid flow rate, fluid pressure, speed, location, movement direction, and/or temperature of one or more components of the pressurized fluid source or fluid provided by the pressurized fluid source 112.

One or more sensors 134 may be coupled to the personal propulsion device 114 to assess, measure and/or monitor one or more features, conditions, and characteristics of the personal propulsion device 114 before, during, and/or after use. For example, the personal propulsion device 114 may include one or more sensors 134 coupled thereto to measure or monitor position, angular orientation, tilt, speed, acceleration, elevation/altitude, fluid outlet conditions (e.g., position, angular orientation, fluid output performance), roll, yaw, pitch, roll rate, yaw rate, pitch rate, and/or the like. In one aspect, the one or more sensors 134 may include an altimeter. In aspects implementing altimeter, the altimeter may include a sonic altimeter, radar altimeter, or the like. In one aspect, the one or more sensors 134 may include an accelerometer. In aspects implementing an accelerometer, the accelerometer may include a bulk micromachined capacitive accelerometer, a bulk micromachined piezoelectric resistive accelerometer, a capacitive spring mass system base accelerometer, a DC response accelerometer, an electromechanical servo (Servo Force Balance) accelerometer, a high gravity accelerometer, a laser accelerometer to motor accelerometer, a low frequency accelerometer, a magnetic induction accelerometer, a modally tuned impact hammer accelerometer, null-balance accelerometer, optical accelerometer, pendulous integrating gyroscopic accelerometer (PIGA), a piezoelectric accelerometer, a resonance accelerometer, a seat pad accelerometer, a shear mode accelerometer, a strain gauge accelerometer, a surface acoustic wave (SAW) accelerometer, a surface micromachined capacitive (MEMS) accelerometer, a thermal (submicrometre CMOS process) accelerometer, a triaxial accelerometer, a vacuum diode with flexible anode accelerometer, a potentiometric type accelerometer, a LVDT type accelerometer and the like. In one aspect, the one or more sensors 34 may include a tilt sensor. The tilt sensor may include a microelectromechanical systems (MEMS) sensor that enables tilt angle measuring tasks to be performed in both single and dual axis mode such as an ultra-high precision two-axis MEMS driven digital inclinometer/tiltmeter.

Figure 17:
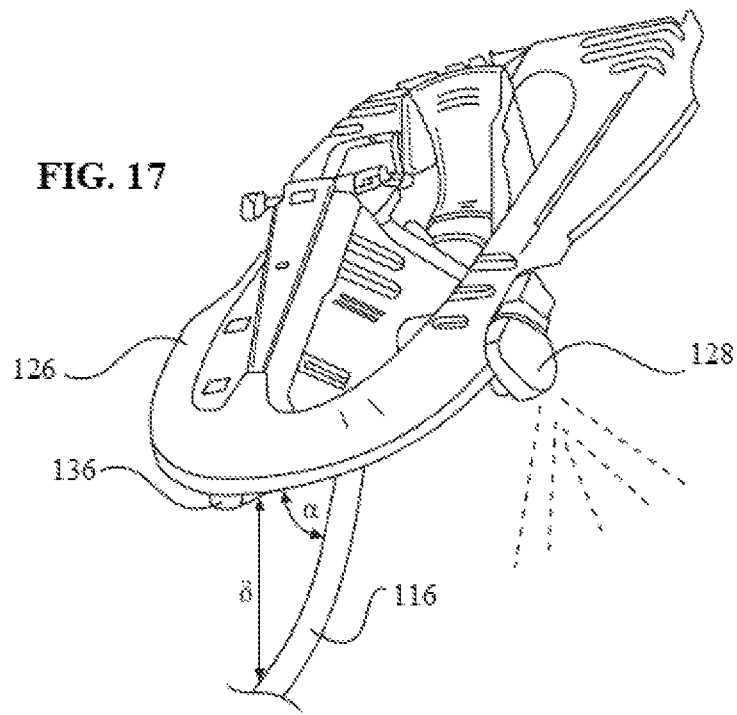
FIG. 17 is an illustration of an example of a position assessment feature of a pressurized-fluid flight system constructed in accordance with the principles of the present disclosure.

The system 110 may include a position assessment element 36 operable and configured to assess, measure, and/or monitor a distance or angle between at least a portion of the fluid delivery conduit 116 and a portion of the personal propulsion device 114, which may be indicative of a height or position of the personal propulsion device 114. The position assessment element 136 may include, for example, an angular position sensor, a rotary encoder, an optical sensor, an impedance sensor, capacitive transducer, capacitive displacement sensor, eddy-current sensor, ultrasonic sensor, grating sensor, hall effect sensor, inductive non-contact position sensor, laser doppler vibrometer (optical), linear variable differential transformer (LVDT), multi-axis displacement transducer, photodiode array, piezo-electric transducer, potentiometer, string potentiometer, and/or the like. In the example shown in FIG. 17, the position assessment element 136 is coupled to the platform 126 and assesses an angle α formed between the fluid delivery conduit 116 and an underside of the platform 126. The angle α varies depending on the height or elevation of the platform 126. For example, when the platform 126 is on or near the surface of a body of water, the angle α is smaller since the fluid delivery conduit 116 is also on or near the surface of the water. As the platform 126 is elevated, the angle α increases, thus giving an indication of the height or elevation of the platform. Assessing height through the angular position of the fluid delivery conduit 116 can provide an accurate height measurement at lower heights or altitudes where traditional altimeters may be inaccurate or inoperable.

In operation similar to assessing the angle α, the position assessment element 136 may monitor and/or measure a distance 'd' between a discrete point or location on the platform 126 and a discrete point or location on the fluid delivery conduit 116, and extrapolate, deduce or calculate a height of the platform 126 based upon the distance 'd', with a larger measured value indicating a greater height.

The system 110 may include one or more controllers 138 operable to modify, adjust, or otherwise control the various components of the system, including for example, the pressurized fluid source 112, the fluid discharge ports 118, 120, fluid control valves 124, fluid outlets 128, and/or actuators 130. A controller 138 may be implemented as a single control implementing one or more aspects of the system 110, or alternatively, multiple controllers may be implemented with each controller implementing one or more aspects of the system. For example, individual controllers may be implemented for each of the pressurized fluid source 112, the fluid discharge ports 118, 120, fluid control valves 124, fluid outlets 128, and actuators 130. The controller(s) 138 may receive information from one or more of the sensors or components described herein, and may be positioned or located on a surface or portion of the system 110 accessible to a user during operation. For example, one or more controllers 138 may be coupled to the personal propulsion device 114 to allow a passenger to monitor or provide input into the controller, for example, by operation of the input controls 140, to affect operation of the system 110. In addition, and/or alternatively, one or more controllers 138 may be coupled to the pressurized fluid source 112 to allow an operator or passenger thereon to monitor or provide input into the controller to affect operation of the system 110.

The controller 138 may generally include a processor, a power supply, a memory, a clock, an analog to digital converter (A/D), digital to analog converter (DAC), one or more input/output (I/O) ports, and the like. The I/O ports may be configured to receive signals from any suitably attached electronic device and forward these signals from the A/D and/or to processor. These signals include signals from the sensors. If the signals are in analog format, the signals may proceed via the A/D. In this regard, the A/D may be configured to receive analog format signals and convert these signals into corresponding digital format signals. The controller 38 may include a transceiver configured to transmit signals, such as control signals and the like, over a wired and/or wireless communication channel as defined herein to communicate with the other sensors and components of the system 110.

In an exemplary of use of the system 110, the pressurized fluid source 112 may be operated to deliver pressurized fluid, such as water, through the fluid delivery conduit(s) 116 to the personal propulsion device 114 to elevate the personal propulsion device to achieve flight. In particular, the pressurized fluid source 112 may be operated and/or controlled from one or more controllers 138 coupled to the personal propulsion device 114 to deliver pressurized fluid to the fluid outlet(s) 128 coupled to the platform 126. The flow or delivery of fluid through the system 110 may be modified or adjusted during use through operation of one or more of the fluid control valves 124 disclosed herein to achieve a desired position, orientation, or movement of the personal propulsion device 114 and/or the pressurized fluid source 112. Such modification may be performed through actions taken or inputs entered by a passenger of the system 110, for example, by operation of the input controls 140, or performed automatically in association with feedback and information provided by the various sensors disclosed herein.

In one example of operating the system 110, it may be desired to maintain the platform 126 in a substantially balanced, horizontal orientation at a particular height, while the pressurized fluid source 112 tows or pulls the personal propulsion device along in a body of water. During such use, the pressurized fluid source 112 may be operated to deliver sufficient fluid to the fluid outlets 128 to sustain the platform 126 (and any passengers, equipment, and/or cargo thereon) at a preset height in a substantially level state. The height of the platform 126 may be monitored by the sensors 134 (such as an altimeter or otherwise) and/or the position assessment element 136 monitoring an angle or distance between the platform 126 and the fluid delivery conduit 116, and such monitored information may be communicated to the controller 138. The controller 138, in turn, may analyze or assess the received information, and modify the fluid flow through one or more segments of the system 110 to maintain an achieved or preset height by, for example, increasing/decreasing output of the pressurized fluid source 112, adjusting one or more fluid control valves 124 in the fluid flow path of the system, and/or changing a position or orientation of the fluid outlets 128 through operation of the actuators 130.

The system 110 may be similarly operated to maintain or limit an amount of pitch, roll, yaw, pitch rate, roll rate, yaw rate, and the like experienced by the platform 126 to prevent tipping over or ejection of a passenger. For example, the controller 138 may have preset, predefined threshold limits for pitch, roll, yaw, pitch rate, roll rate, yaw rate, and the like. In one such example, it may be desirable to limit or prevent the platform 26 from rolling or pitching past an angle of approximately thirty degrees with respect to a horizon or level reference point. The system 110 may monitor the orientation of the platform through the sensors 134 (including, for example, one or more accelerometers or tilt sensors), and communicate the measurements to the controller 138 for subsequent corrective action to be taken with respect to the pressurized fluid source 112, one or more of the fluid control valves 124, fluid outlets 128, and/or actuators (e.g., fluid flow, position, and/or orientation of the fluid outlet). In one aspect, the controller 138 may implement predefined roll, yaw, pitch, roll rate, yaw rate, pitch rate, and/or the like limits. In a further aspect, the controller 138 may have a plurality of predefined limits such as beginner, novice, and expert, and the controller 138 may control the personal propulsion device 114 based on these plurality of predefined limits. In other words, the controller 138 may be set for beginner and may implement predefined roll, pitch, yaw, and the like limits for beginner use. In one aspect, the one or more controllers 138 may implement electronic stability control that improves the personal propulsion device 114 stability by detecting and reducing loss of control. During normal operation the electronic stability control may work in the background and continuously monitor the personal propulsion device 114 operation. It compares the user's intended operation (determined through the input controls 140) to the personal propulsion device 114 actual direction (determined through measured lateral acceleration, roll, yaw, pitch, roll rate, yaw rate, pitch rate, and/or the like by the sensors 134). The electronic stability control may intervene only when it detects a probable loss of control to stabilize the personal propulsion device 114 by actively controlling operation of the one or more fluid outlets 128.

In addition and/or alternatively to the methods described above, operation of the pressurized fluid source 112 may be modified, controlled, or adjusted to achieve a desired movement, orientation, and/or position of the pressurized fluid source 112. For example, the system 110 may be operated such that fluid expelled from the second fluid discharge port 120 of the pressurized fluid source is modified by the controller 138 to move, steer, or otherwise control the pressurized fluid source independently of the control and positioning of the personal propulsion device 114.

Features of the present disclosure can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Features of the present disclosure can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Storage medium refers to any volatile or non-volatile computer readable storage device such as magnetic storage, semiconductor memory, DVD, Compact Disk or memory stick, but does not encompass a signal propagation media such as a copper cable, optical fiber or wireless transmission media. Program code may be transmitted to a computer constructed in accordance with the principles of the present disclosure using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. It is noted that the computer programs of the present invention can be downloaded via the Internet to a computer.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

It will be appreciated by persons skilled in the art that the present disclosure is not limited to what has been particularly shown and described herein above. In addition, unless mention was made above to the contrary, it should be noted that all of the accompanying drawings are not to scale. Of note, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the examples disclosed herein are not necessarily exclusive of each other and may be included in a variety of different combinations or configurations without departing from the scope and spirit of the disclosure. A variety of modifications and variations are possible in light of the above teachings without departing from the scope and spirit of the disclosure, which is limited only by the following claims.

What is claimed is:

1. A propulsion device, comprising:
    a platform arranged to seat a passenger;
    a thrust assembly coupled to the platform, the thrust assembly including at least two nozzles configured to discharge a pressurized fluid therefrom, wherein the at least two nozzles are movable with respect to the platform;
    a plurality of actuators, wherein each actuator is coupled to one of the at least two nozzles, wherein each actuator is configured to adjust an angular orientation of its respective nozzle with respect to the platform;
    a first sensor coupled to the platform to measure at least one of a pitch and roll of the platform; and
    a controller in communication with the first sensor and the plurality of actuators, wherein the controller is configured to adjust an operation of the actuators based at least in part on information from the first sensor to modify an angular orientation of the at least two nozzles.

2. The propulsion device according to claim 1, further comprising a remote pressurization station supplying pressurized fluid to the thrust assembly.

3. The propulsion device according to claim 2, wherein the remote pressurization station is coupled to the assembly by a flexible supply conduit.

4. The propulsion device according to claim 3, wherein the remote pressurization station is a personal watercraft.

5. The propulsion device according to claim 1, wherein the at least two nozzles are respectively positioned at port and starboard positions of the platform.

6. The propulsion device according to claim 1, further comprising a second sensor configured to measure a pressure of a pressurized fluid flowing through the thrust assembly, wherein the second sensor is in communication with the controller.

7. The propulsion device according to claim 6, wherein the controller is configured to adjust an operation of the actuators based at least in part on information from the second sensor.

8. The propulsion device according to claim 1, further comprising a plurality of second sensors, wherein each of the plurality of second sensors is configured to measure an angular position of one of the at least two nozzles, and wherein the plurality of second sensors is in communication with the controller.

9. The propulsion device according to claim 8, wherein the controller is configured to adjust an operation of the actuators based at least in part on information from the plurality of second sensors.

10. The propulsion device according to claim 1, further comprising a user interface coupled to the platform that is configured to receive input from a user comprising at least one of a change of direction input and a change of altitude input, and wherein the controller is in communication with the user interface.

11. The propulsion device according to claim 1, wherein the user interface includes handle bars rotatably coupled to the platform.

12. The propulsion device according to claim 10, wherein the controller is configured to adjust an operation of the actuators based at least in part on information from the user interface.

13. The propulsion device according to claim 1, further comprising a second sensor coupled to the platform configured to measure an altitude of the platform, wherein the second sensor is in communication with the controller, and wherein the controller is configured to adjust an operation of the actuators based at least in part on information from the second sensor.

14. The propulsion device according to claim 1, wherein the controller implements a PID calculation to adjust an operation of the actuators.

15. The propulsion device according to claim 1, wherein the at least two nozzles are movable in a plane that is substantially parallel to a longitudinal axis of the platform extending from a stern to a bow of the platform.

16. The propulsion device according to claim 1, further comprising a stern nozzle immovably affixed to the platform at a rear portion of the platform.

17. The propulsion device according to claim 16, wherein the stern nozzle defines an oblong cross-section along a portion thereof.

18. The propulsion device according to claim 16, wherein at least two nozzles are positioned at a bow or front portion of the platform.

19. The propulsion device according to claim 18, wherein the thrust assembly includes a substantially rigid fluid delivery conduit extending from the stern nozzle to the at least two nozzles.

20. The propulsion device according to claim 19, further comprising a seat coupled to the substantially rigid fluid delivery conduit.

* * * * *